(12) United States Patent
Ishii et al.

(10) Patent No.: US 7,639,571 B2
(45) Date of Patent: Dec. 29, 2009

(54) TIMEPIECE

(75) Inventors: Junichiro Ishii, Matsumoto (JP);
Manabu Akahane, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 180 days.

(21) Appl. No.: 11/808,419

(22) Filed: Jun. 8, 2007

(65) Prior Publication Data

US 2008/0002527 A1    Jan. 3, 2008

(30) Foreign Application Priority Data

Jun. 30, 2006    (JP)    ............... 2006-181393

(51) Int. Cl.
G04C 19/00    (2006.01)

(52) U.S. Cl. .................. 368/82; 368/223; 368/282

(58) Field of Classification Search ............. 368/82–84, 368/87, 223, 239, 282
See application file for complete search history.

(56) References Cited

U.S. PATENT DOCUMENTS

| 3,823,549 | A |   | 7/1974 | Feldman |
| 4,130,987 | A | * | 12/1978 | Schickedanz ................ 368/29 |
| 4,320,484 | A | * | 3/1982 | Burdet ....................... 368/239 |
| 5,455,808 | A | * | 10/1995 | Grupp et al. .................. 368/82 |
| 5,740,130 | A | * | 4/1998 | Grupp et al. .................. 368/82 |
| 6,216,490 | B1 |   | 4/2001 | Radley-Smith |
| 6,571,577 | B2 | * | 6/2003 | Radley-Smith ................. 63/3 |
| 6,621,766 | B2 | * | 9/2003 | Brewer et al. ................. 368/82 |
| 6,903,784 | B1 | * | 6/2005 | Basturk ......................... 349/2 |
| 2002/0109808 | A1 | * | 8/2002 | Sekiguchi et al. ............. 349/96 |
| 2003/0016590 | A1 |   | 1/2003 | Brewer et al. |
| 2004/0212870 | A1 |   | 10/2004 | Katase |

FOREIGN PATENT DOCUMENTS

| CN | 1243977 A | 2/2000 |
| EP | 1580711 A1 | 9/2005 |
| JP | S54-151056 A | 11/1979 |
| JP | 2005-250442 A | 9/2005 |
| WO | WO-96/21888 A1 | 7/1996 |
| WO | WO-00/59327 A1 | 10/2000 |
| WO | WO-03/083561 A2 | 10/2003 |

\* cited by examiner

*Primary Examiner*—Felix O Figueroa
*Assistant Examiner*—Thanh S Phan
(74) *Attorney, Agent, or Firm*—Global IP Counselors, LLP

(57) ABSTRACT

A timepiece has a display panel having electrophoretic particles between two opposing substrates, and a drive circuit unit having a display drive unit for applying an electric field between the substrates and a timekeeping unit for keeping time information. A plurality of first electrodes are rendered in the shapes of a plurality of symbols used to display time information content on one of the substrates, and a second electrode is disposed on the other substrate for applying a voltage between the first electrodes and the second electrode.

6 Claims, 19 Drawing Sheets

TIMEPIECE

BACKGROUND

1. Technical Field

The present invention relates to a timepiece having an electrophoretic display panel.

2. Related Art

Electrophoretic display panels that use electrophoresis, which is a method of applying an electric field to cause charged particles dispersed in a liquid medium to migrate to a particular electrode, and display devices that use electrophoretic display panels are known from the literature. Such electrophoretic display panels have this dispersion of charged particles sealed between a substrate on a front surface side and a substrate on a back side, and the display panel can be made flexible by using flexible substrates. This can be used to render a wristwatch that has a display panel such as this electrophoretic display panel disposed around the outside of a ring-shaped bracelet as taught, for example, in Japanese Unexamined Patent Appl. Pub. JP-A-2005-250442, paragraph [0022].

As described in Japanese Unexamined Patent Appl. Pub. JP-A-S54-151056, the display part of this type of electrophoretic display panel has a plurality of display units (segments) corresponding to each of the characters used to display the time or other content, a segment electrode is provided on one of the substrates for each of these segments, a common electrode is provided on the other substrate, and a voltage is applied between these electrodes to display information. In order to display the numbers 0 to 9 that are needed to display the time, for example, the digit 8 is rendered with 7 or 13 substantially rectangular segments, and the same number of segment electrodes are rendered on the one substrate. Each of these segment electrodes can be separately driven according to the time information to refresh the display rendered in the time display area where these segments electrodes are disposed as time progresses.

This segment display method, however, requires 7 or 13 segment electrodes for each character that is displayed. With the development of flexible electrophoretic display panels and the ability to render the display panel around the outside of a ring-shaped case as described above, the display panels have become much larger. When this large display area is used to display numerous characters each rendered with 7 or 13 segments to display more information or patterns, the number of pins required to drive the characters increases significantly. Because the number of output pins on the drive circuit of the display panel is limited, rendering such displays becomes difficult and the wiring is complicated. In other words, while demand for larger display panels continues to rise, there is a limit to what can be practically achieved with conventional segment display methods.

In addition, because conventional segment display methods display each character using a combination of 7 or 13 segments, the numbers or letters that are displayed are uniform and the designs that can be displayed are limited.

SUMMARY

The timepiece according to the present invention greatly reduces the number of pins that are required for the electrophoretic display panel and improves the freedom of design displaying time information.

A timepiece according to a preferred aspect of the invention has a display panel having electrophoretic particles between two opposing substrates, and a drive circuit unit having a display drive unit for applying an electric field between the substrates and a timekeeping unit for keeping time information. A plurality of first electrodes are rendered in the shapes of a plurality of symbols used to display time information content on one of the substrates, and a second electrode is disposed on the other substrate for applying a voltage between the first electrodes and the second electrode.

The first electrodes are rendered with the same shapes as the symbols used to display time information content. To display the hour, for example, the first electrodes are disposed as individual design elements rendering the numbers 1 to 12. When the hour of the time kept by the timekeeping unit is 3, for example, the first electrode rendered in the shape of the symbol (number) for "3" is selected, and the drive circuit unit applies a voltage between this first electrode and the second electrode. This produces an electric field between the substrates causing electrophoretic particles to migrate toward the substrate on the front side of the display panel, and the symbol for "3" is displayed in the display area of the first electrode in the color of the electrophoretic particles.

By forming the electrodes in the shapes of the symbols, the number of pins required to drive the electrodes to display numerous different symbols can be significantly reduced compared with the related art. Because the pin count can thus be greatly reduced, more electrodes can be provided in the display panel while keeping the total number of pins required to drive the display panel within the limited number of output pins available on the drive circuit unit of the display panel. Complex and intricate images can therefore be displayed.

The first electrodes can also be freely shaped according to the corresponding symbols, and the location of each symbol on the display panel can also be freely controlled. The wiring to each first electrode can therefore be arranged with greater freedom than is possible with the segment display method of the related art, and design and manufacturing can be simplified.

In addition to reducing the pin count as described above, the shape of the first electrodes can be made to match the freely designed shapes of the symbols. The limits on the display design imposed by the segment display method of the related art can therefore be eliminated, and the time can be displayed in creative, innovative ways. For example, the first electrode for displaying the numeric symbol for "1" can be designed to any shape that can be recognized as a "1." As a result, the first electrodes used to display the same symbol (such as "1" in this case) can be shaped in different ways. The shape of the first electrodes can thus be designed with a greater degree of design freedom, the shapes of the first electrodes can be freely and attractively designed, the design used to display the time on the display panel can be freely arranged, and the invention helps to greatly improve the design of the time display unit of a timepiece.

By disposing a plurality of first electrodes in the shape of each symbol on the display panel, the time can be displayed in novel ways such as causing the position where the time is displayed to shift sequentially over time between the first electrodes. More specifically, the uniform segment display of the related art displays the time using the numbers 0 to 9 in the same part of the display panel, and the position where the time is displayed remains the same at all times. The present invention, however, enables using the layout of the plural first electrodes to be used as an additional design element to display the time information at different display positions depending upon the current time. For example, if the time is displayed using the numbers 0 to 12 (or 0 to 24), the individual numbers can be rendered at various locations within the display area of the display panel. As a result, when the number displaying the time changes, the display position also changes. The time can therefore be displayed using novel ways not possible with the related art, and the design of the time display on the timepiece can be greatly improved.

The display of time information can therefore be designed with greater freedom while also greatly reducing the number of pins required on the electrophoretic display panel.

The display color of the display panel depends on the color of the electrophoretic particles and the color of the solution in which the electrophoretic particles are dispersed. The colors of the electrophoretic particles and the solution can be determined to achieve the desired appearance and ensure that the time information can be easily read.

In another aspect of the invention a plurality of first electrodes are rendered for each type of symbol, and each of the first electrodes for the same type of symbol is rendered at a different position on the surface of the one substrate.

This aspect of the invention enables reading symbols determined by the content of the time information at plural locations on the display panel, and thus improves the readability of the time information. More particularly, if the display panel is curved into a ring, the time can be read from different directions and usability is thus improved.

In a timepiece according to another aspect of the invention of the first electrodes for the same type of symbol are electrically connected to each other.

This aspect of the invention enables reducing the number of pins because the first electrodes for the same type of symbol are mutually conductive and driven to the same potential. These first electrodes are simultaneously selected by the drive circuit unit to display simultaneously.

Yet further preferably the drive circuit unit executes a time information display process to display a symbol selected based on the time information at a specific contrast to a background display part outside the symbol on the display panel, and an intermediate gradation display process to display a symbol other than the selected symbol at a lower contrast than the specific contrast to the background display unit.

By displaying the time at a specific contrast level and additionally displaying other content in an intermediate gradation at a lower contrast level, this aspect of the invention increases the available design elements and thus further improves the display design. For example, a background pattern can be displayed at the lower contrast intermediate gradation behind the symbol selected to display the time, thus assuring the readability of the time information while also providing a variable background pattern as an additional design element.

Displaying intermediate gradations makes symbols other than the symbols used to display the time also visible, and because the locations of the different symbols will be naturally remembered over time, usability as a timepiece for displaying the time can also be improved.

Information that is different from the information displayed in the time information display area can also be displayed in the area where intermediate gradations are displayed. For example, the hour, minute, or second could be displayed in the time information display area, and the date, weekday, or other calendar information could be displayed in the intermediate gradation display area.

Yet further preferably, at least one of the first electrodes is shaped so that the corresponding symbol partially overlaps one or more of the other symbols, and the overlapping first electrodes are rendered by an overlapping electrode part forming the overlapping area where the symbols overlap, and a non-overlapping electrode part outside the overlapping electrode part.

This aspect of the invention enables a display with an excellent sense of design because complex, intricate patterns such as overlapping symbols can be rendered using the overlapping electrode parts.

The overlapping electrode parts are shared by different symbols. More specifically, the overlapping electrode parts are used to display one symbol using one first electrode and to display another symbol using another first electrode, and enable displaying overlapping symbols by synchronizing driving the overlapping electrode parts with the non-overlapping electrode parts of the particular symbol being displayed.

Yet further preferably, non-overlapping electrode parts are separated by the overlapping electrode part, and the separated non-overlapping electrode parts are electrically connected together.

This aspect of the invention enables further reducing the number of pins because the overlapping electrode parts are mutually conductive and equipotential. The number of output pins on the drive circuit unit can therefore be used even more effectively.

Yet further preferably, a plurality of overlapping electrode parts are formed by one symbol and another symbol overlapping at a plurality of locations; and the same combinations of overlapping symbols are electrically connected to each other in the overlapping electrode parts.

This aspect of the invention enables further reducing the number of pins because the overlapping electrode parts in the same combinations of overlapping symbols are mutually conductive and equipotential.

Yet further preferably, the substrates are made from a flexible material, and the display panel curves substantially in a ring shape.

By forming the display panel substantially in the shape of a ring, this aspect of the invention increases the display area of the display panel around the circumference of the ring. By providing a large display area this aspect of the invention also affords an even more beneficial timepiece arrangement because the appearance of the timepiece can be improved while also using fewer pins relative to the size of the display area.

When the first electrodes corresponding to the same symbol types are rendered at different locations on the substrate surface, the time information can be read using the symbols of the same type from multiple directions to the display panel, thus further improving convenience and usability.

As a result, the timepiece according to the present invention greatly reduces the number of pins that are required for the electrophoretic display panel and improves the freedom of design displaying time information.

Other objects and attainments together with a fuller understanding of the invention will become apparent and appreciated by referring to the following description and claims taken in conjunction with the accompanying drawings.

DESCRIPTION OF EXEMPLARY EMBODIMENTS

Preferred embodiments of the present invention are described below with reference to the accompanying figures.

Embodiment 1

1. General Arrangement

Figure 1:
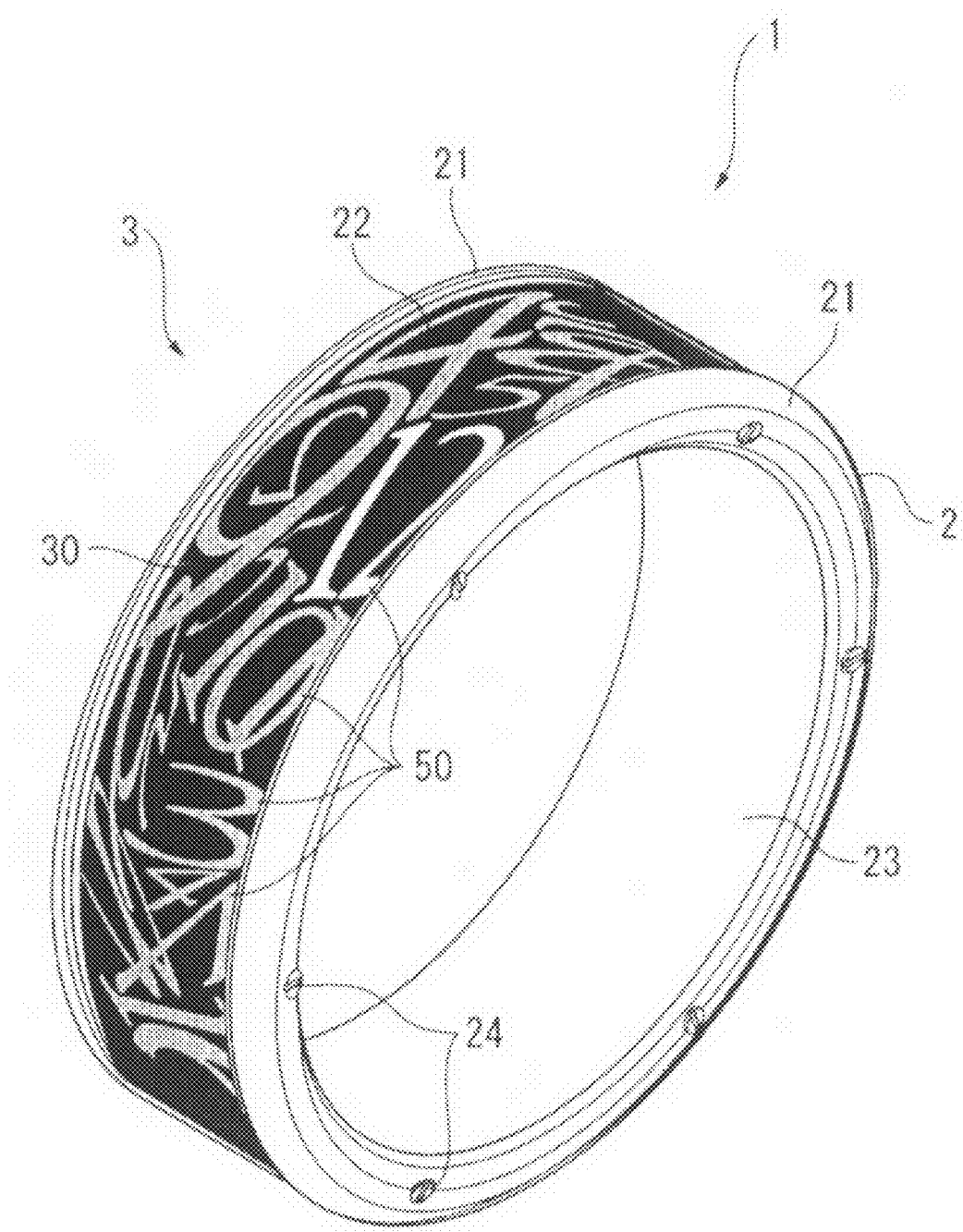
FIG. 1 is an external oblique view of an electronic timepiece according to a first embodiment of the invention.

FIG. 1 is an oblique external view of a timepiece 1 according to a first embodiment of the invention. This timepiece 1 is rendered as a bracelet watch that can be worn on the wrist and has an electrophoretic display panel 30 disposed to the outside of an annular case 2. Numeric symbols indicating the time are displayed on the electrophoretic display panel 30.

Figure 2:
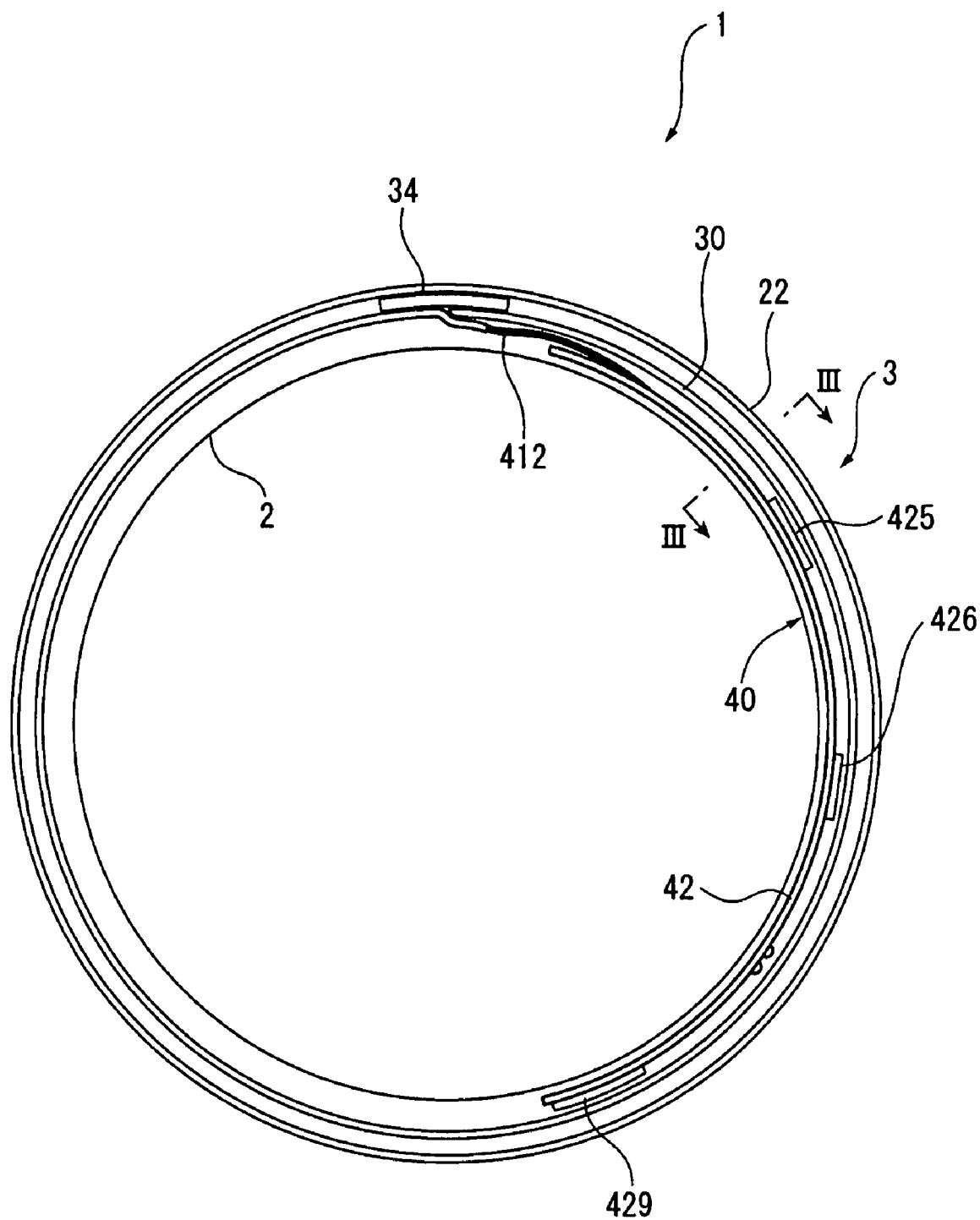
FIG. 2 is a side section view of the electronic timepiece in a preferred embodiment of the invention.
Figure 3:
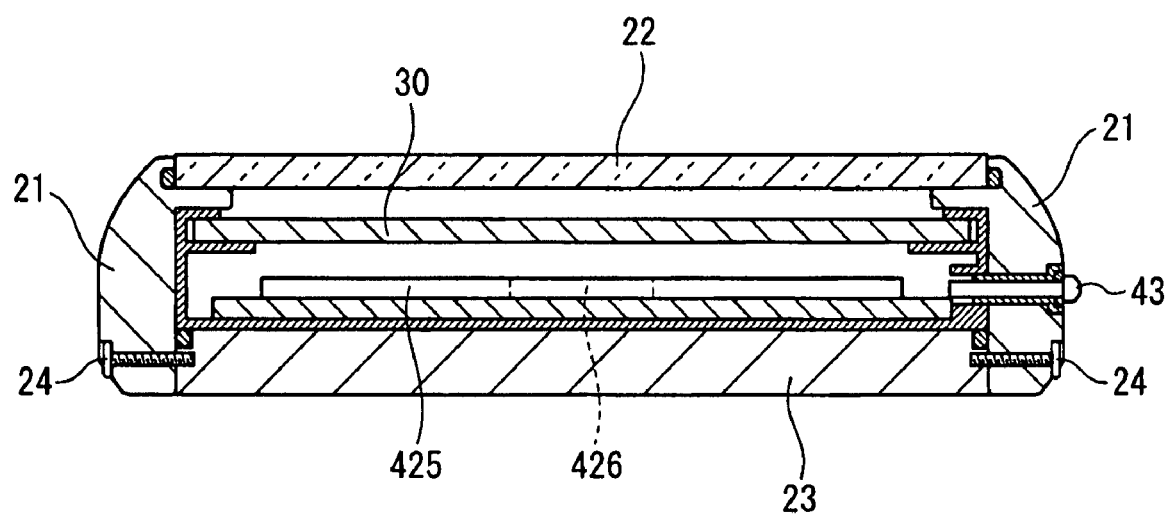
FIG. 3 is a section view through line III-III in FIG. 2.

FIG. 2 is a side section view of the electronic timepiece 1, and FIG. 3 is a section view through line III-III in FIG. 2. Note that shading denoting the sections is not shown in FIG. 2.

The timepiece 1 has a case 2 and a display module 3 including the electrophoretic display panel 30. As shown in FIG. 3, the case 2 is shaped like a bobbin with a rib 21 projecting radially through the thickness of the case 2 from opposite ends of the case 2, and the display module 3 is disposed between the ribs 21. The case 2 is surrounded by a crystal 22 covering the display module 3 on the outside circumference side, and has an inside cover 23 on the inside circumference side. The inside cover 23 is fixed to the ribs 21 with screws 24.

The display module 3 includes the electrophoretic display panel 30 and a drive circuit unit 40 for driving the electrophoretic display panel 30.

Figure 4:
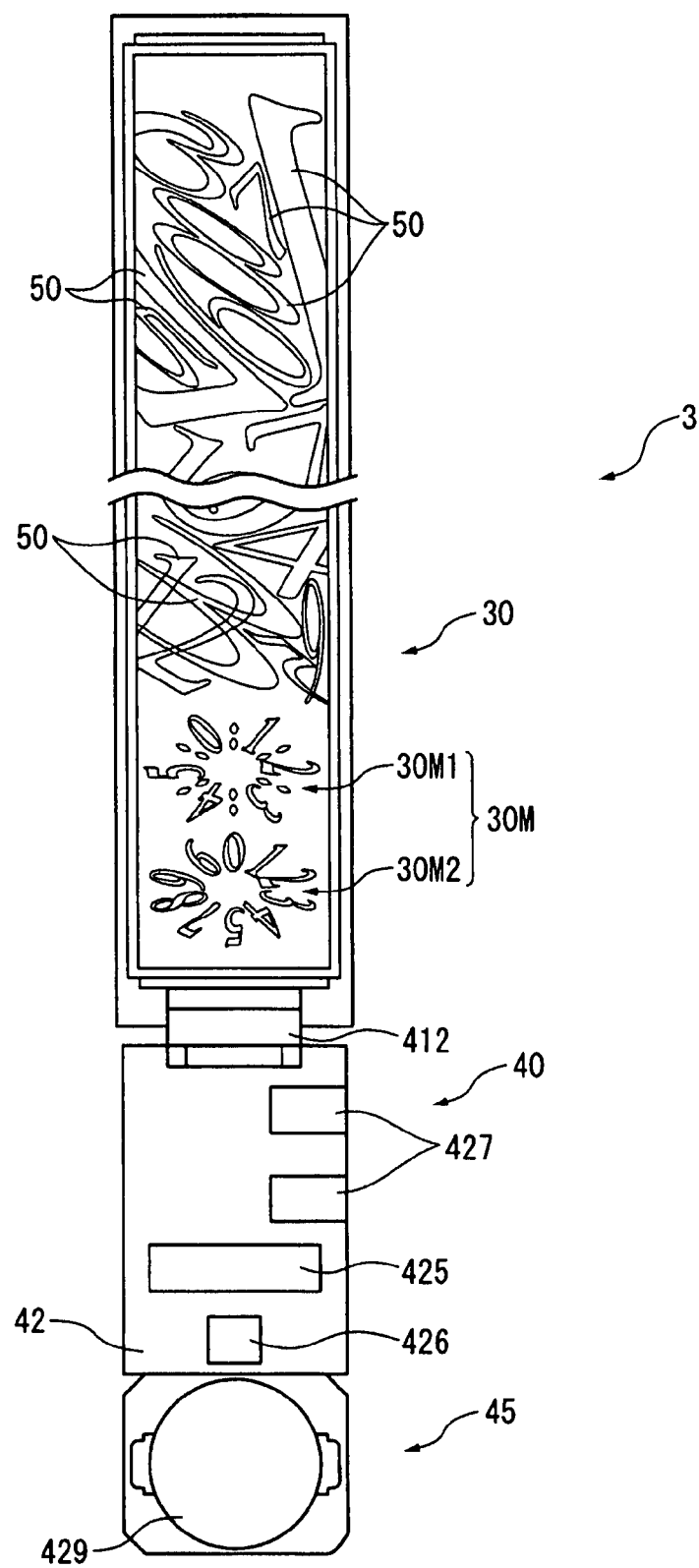
FIG. 4 is a plan view of the display panel and circuit board in the preferred embodiment of the invention.
Figure 5:
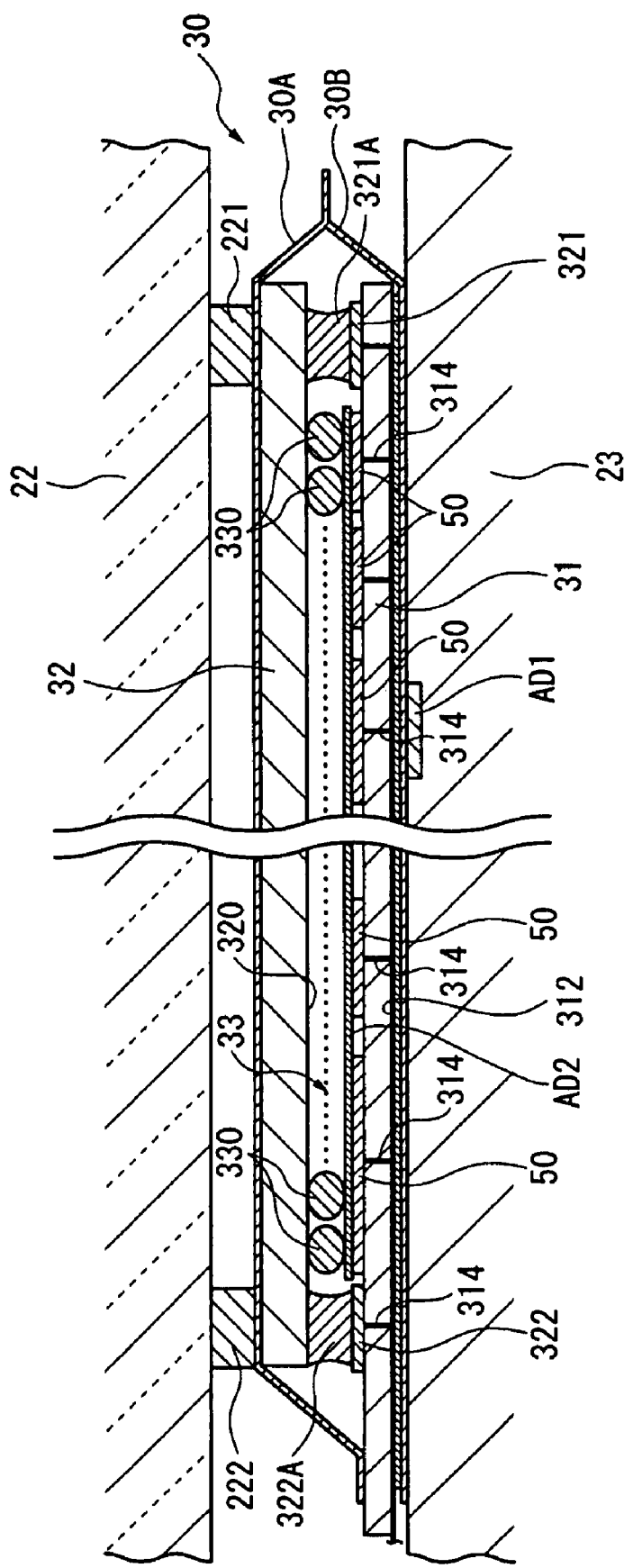
FIG. 5 is a section view of the display panel in the preferred embodiment of the invention.

FIG. 4 is a plan view of the electrophoretic display panel 30 of the display module 3 and the circuit board 42. FIG. 5 is a section view of the electrophoretic display panel 30. Note that for simplicity FIG. 5 shows the electrophoretic display flat instead of curved.

As shown in FIG. 4, the circuit board 42 and the electrophoretic display panel 30 are manufactured separately and are connected by a wiring member 412 such as an anistropic conductive film (ACF). As shown in FIG. 5, the electrophoretic display panel 30 is bonded to the case 2 by an adhesive AD1. Double-sided tape, for example, could be used instead of an adhesive AD1.

2. Arrangement of the Display Panel

The electrophoretic display panel 30 is disposed in a band around substantially the entire outside circumference of the case 2, and as shown in FIG. 5 includes a display substrate 31, a transparent substrate 32, and an electrophoretic layer 33 disposed between the display substrate 31 and the transparent substrate 32. The time information displayed on the electrophoretic display panel 30 is visible from the outside through the transparent substrate 32. The transparent substrate 32 and the display substrate 31 are made from a flexible resin such as polyimide or polyester.

As shown in FIG. 2, the electrophoretic display panel 30 curves substantially 360 degrees in a circle with the opposite ends joined together. This joint is covered by an external member 34 as shown in FIG. 2.

The display substrate 31 is a flexible printed circuit board (FPC) made from a flexible resin such as polyimide or polyester. As shown in FIG. 5, the display substrate 31 is thinner than the transparent substrate 32, and has a plurality of symbol electrodes 50 (first electrodes) for controlling the display rendered on the top (outside) surface. These symbol electrodes 50 are also called segment electrodes.

A first common electrode drive electrode 321 is disposed at one lengthwise end and a second common electrode drive electrode 322 is disposed at the other lengthwise end on the top of the display substrate 31 with the symbol electrodes 50 between these drive electrodes 321 and 322. An adhesive AD2 (adhesive layer) is disposed over the top of the symbol electrodes 50, and a plurality of microcapsules 330 are bonded to the top of the symbol electrodes 50 by this adhesive AD2. An electrophoretic dispersion is sealed inside each of the microcapsules 330. The electrophoretic dispersion contains positively charged black particles and negatively charged white particles. These numerous microcapsules 330 render the electrophoretic layer 33.

As shown in FIG. 5, the symbol electrodes 50 and the first and second common electrode drive electrodes 321 and 322 are disposed to the top surface of the display substrate 31 (the side facing the transparent substrate 32), and wiring 312 connecting these electrodes to the circuit board 42 through the wiring member 412 (FIG. 2, FIG. 4) is disposed on the back surface of the display substrate 31. The wiring 312 and the symbol electrodes 50 and other electrodes are connected by vias 314 passing through the thickness of the display substrate 31. The electrodes of the electrophoretic display panel 30 are thus wired through the thickness of the electrophoretic display panel 30.

A transparent common electrode 320 (second electrode) made of ITO (indium tin oxide), for example, is disposed on the back side of the transparent substrate 32 (the side facing the display substrate 31). The common electrode 320 is disposed over substantially the entire surface of the transparent substrate 32 on the side facing the display substrate 31, and functions as the common electrode for each of the symbol electrodes 50. Voltage is applied between the common electrode 320 and particular symbol electrodes 50 to drive the display. The common electrode 320 is connected to the first common electrode drive electrode 321 through an intervening conductive member 321A, and the common electrode 320 is connected to the second common electrode drive electrode 322 through an intervening conductive member 322A. These conductive members 321A and 322A are made from a conductive adhesive, for example, and the common electrode 320 and first and second common electrode drive electrodes 321 and 322 are thus preferably bonded together by a conductive adhesive rendering conductivity between the common electrode 320 and the first and second common electrode drive electrodes 321 and 322.

The transparent substrate 32, the electrophoretic layer 33, and the display substrate 31 are sealed by a moisture resistant sheet 30A disposed on the top of the transparent substrate 32 and a moisture resistant sheet 30B disposed on the bottom of the display substrate 31 to prevent moisture from penetrating to the electrophoretic layer 33. More specifically, the inside side of the moisture resistant sheets 30A and 30B is coated with a hot melt material as an adhesive layer, the end parts of the moisture resistant sheets 30A and 30B are fused together using a vacuum laminator, for example, and the moisture resistant sheets 30A and 30B are bonded to the display substrate 31 and the transparent substrate 32, thereby sealing the transparent substrate 32, the electrophoretic layer 33, and the display substrate 31 at the substrate ends and the top and bottom surfaces.

Figure 6:
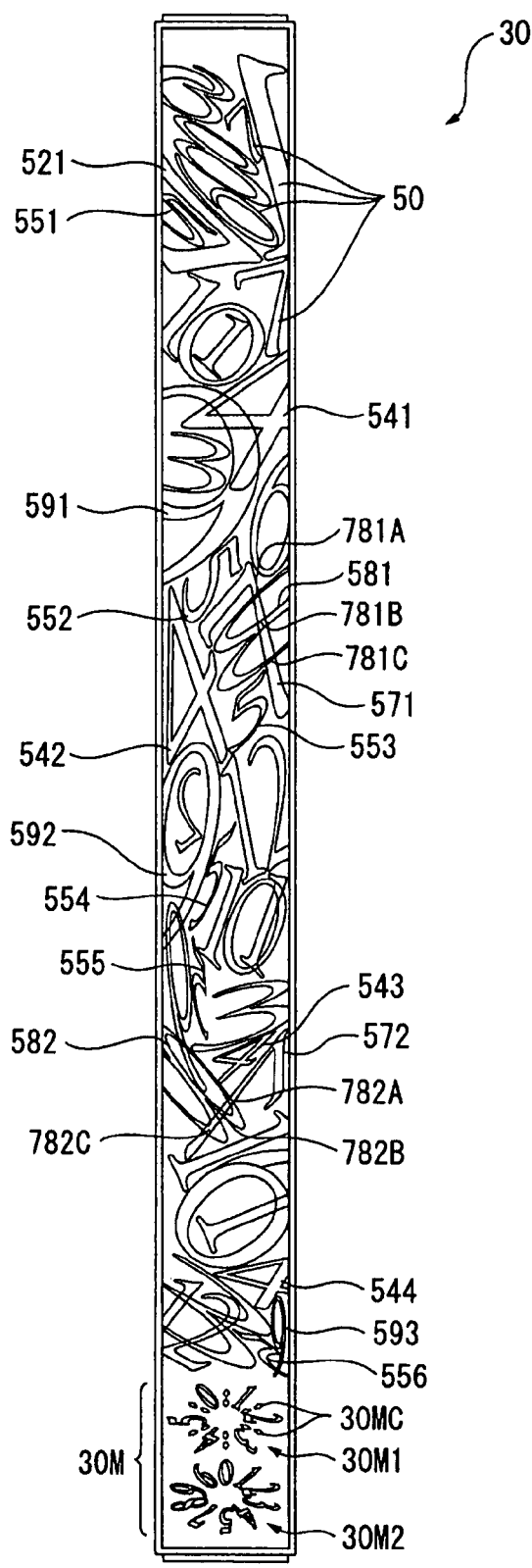
FIG. 6 is a plan view of the electrophoretic display panel in the preferred embodiment of the invention.

FIG. 6 is a plan view of the electrophoretic display panel 30. As shown in the figure, multiple numeric symbols formed as graphic design elements are rendered at overlapping positions over substantially the entire display area of the electrophoretic display panel 30 by means of symbol electrodes 50 (first electrodes) rendered in the shape of the numeric symbols. A symbol electrode 50 is provided for each of the numeric symbols. Some of the symbol electrodes 50 are rendered as the inverse of the normal shape of the numeric symbol, and the symbol electrodes 50 are rendered so that the symbols face various directions. A feature of the timepiece according to this aspect of the invention is that the hour of the time is displayed by the corresponding symbol electrodes 50, and the overlapping numeric symbols of the electrophoretic display panel 30 afford a lively, novel design.

In this aspect of the invention the symbol electrodes 50 are rendered in the shape of twelve graphic elements rendering the numbers 1 to 12 to denote the hour, and at least three symbol electrodes 50 are provided for each type of numeric symbol. The three symbol electrodes 591 to 593 are provided to render the symbol "9", for example, in three different locations. The symbol electrodes 50 for the at least three symbols of the same type (representing the same number) are disposed at separate locations around the circumference when the display panel 30 forms a ring.

While symbol electrodes 50 are provided for plural different types of symbols, they are referred to herein as simply symbol electrodes 50 when differentiating particular symbol electrodes 50 is not necessary. When the time is displayed, the symbol electrodes 50 are selectively driven to display the hour in the display area of one or more of the symbol electrodes 50.

A minute display unit 30M is provided at one end part of the electrophoretic display panel 30 to display the minute part of the time. The minute display unit 30M includes tens display unit 30M1 for displaying the tens digit, and a ones display unit 30M2 for displaying the ones digit. The tens display unit 30M1 includes a colon display unit 30MC. Symbol electrodes in the shape of numbers as graphic design elements are disposed to the tens display unit 30M1 and the ones display unit 30M2, but because the arrangement and operation of these symbol electrodes will be understood from the description of the symbol electrodes 50 used to display the hour mentioned above, further description of the symbol electrodes used in the minute display unit 30M is omitted below.

The display panel 30 also has two drive electrodes not shown for driving the background display area, which includes all parts of the rectangular display panel 30 except the areas occupied by the symbol electrodes 50 and the minute display unit 30M.

3. Arrangement of the Drive Circuit Unit

Referring again to FIG. 4, the circuit board 42 is a flexible circuit board made from a flexible resin such as polyimide or polyester similarly to the display substrate 31 and transparent substrate 32. Disposed in non-overlapping positions on the circuit board 42 are a power source 429, a controller 426 for controlling operation of the timepiece 1, a display drive circuit unit 425, and touch sensors 427. The power source 429 in this aspect of the invention is a flexible lithium polymer battery, for example, and supplies power to the other parts. The display drive circuit unit 425 is a driver IC for controlling the display operation of the display panel 30. Operating buttons 43 corresponding to each of the touch sensors 427 are disposed in the case 2.

The display drive circuit unit 425 is connected to the wiring member 412, although the connection is not shown in detail in the figures.

Figure 7:
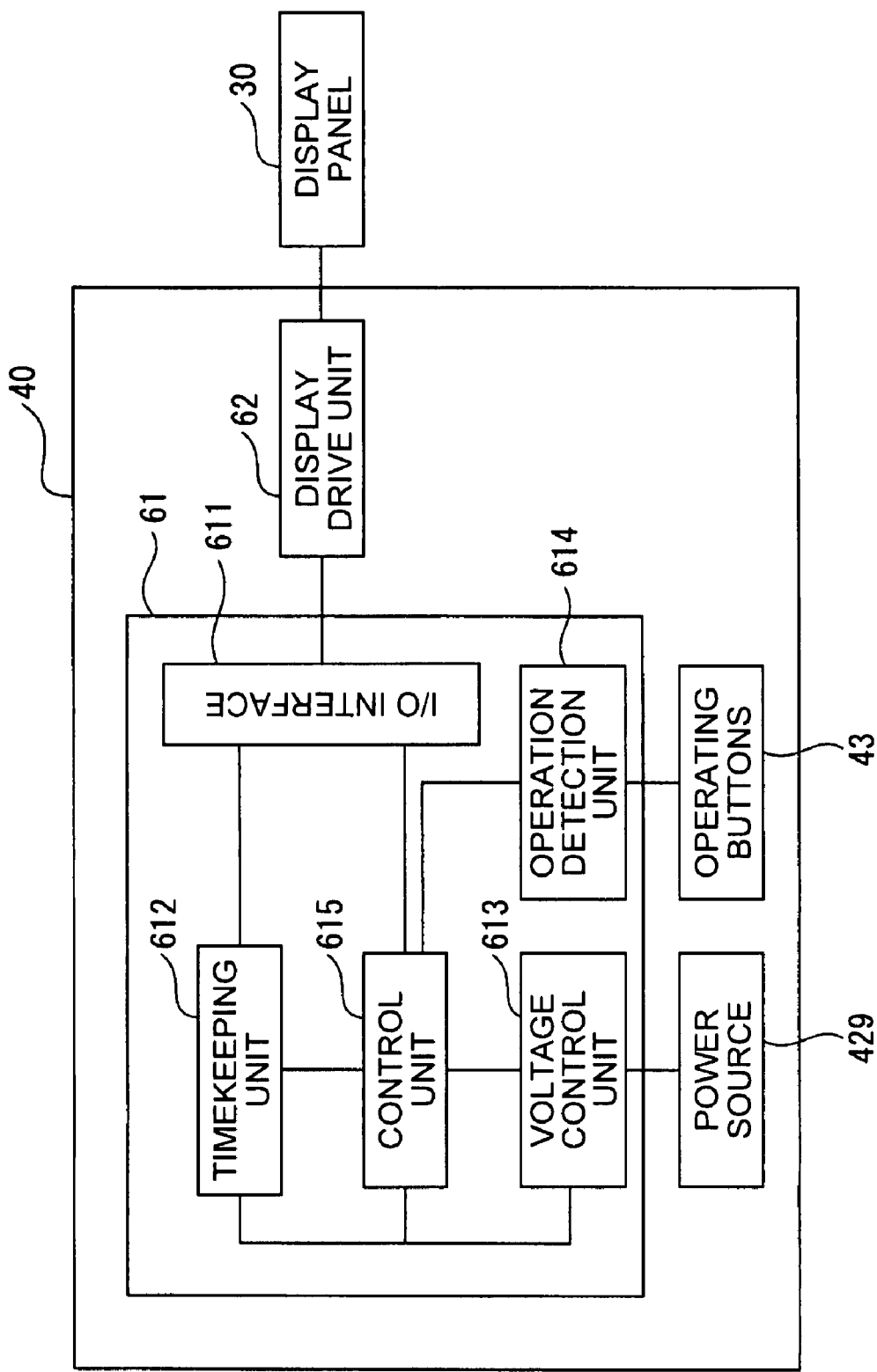
FIG. 7 is a block diagram showing the electrical circuit arrangement of the display module in the preferred embodiment of the invention.

FIG. 7 is a block diagram showing the electrical arrangement of the drive circuit unit 40. The drive circuit unit 40 has a drive control unit 61 disposed to the controller 426, and a display drive unit 62 disposed to the display drive circuit unit 425.

The drive control unit 61 has an I/O interface 611 for managing input to and output from the display drive unit 62, a timekeeping unit 612 for keeping the time, a voltage control unit 613 for supplying power from the power source 429 to the circuit elements 425 to 427, an operation detection unit 614 for detecting operation of the operating buttons 43, and a control unit 615 for controlling operation of the other units 611 to 614.

The timekeeping unit 612 keeps the time by counting the pulses generated by an oscillation circuit not shown, and the timekeeping unit 612 is connected to the display drive unit 62 through the I/O interface 611.

The display drive unit 62 supplies to the display panel 30 a drive signal for applying a voltage between the display substrate 31 and the transparent substrate 32 of the display panel 30. Based on the time information kept by the timekeeping unit 612, the display drive unit 62 selects the symbol electrodes 50 to which the drive signal of a specific potential is to be supplied.

The display drive unit 62 in this aspect of the invention has an internal booster circuit to boost the voltage (typically 3 V) supplied from the power source 429 to the required voltage, such as +15 V.

4. Displaying Using Electrophoresis

Electrophoresis in the display panel 30 is described next.

Figure 8:
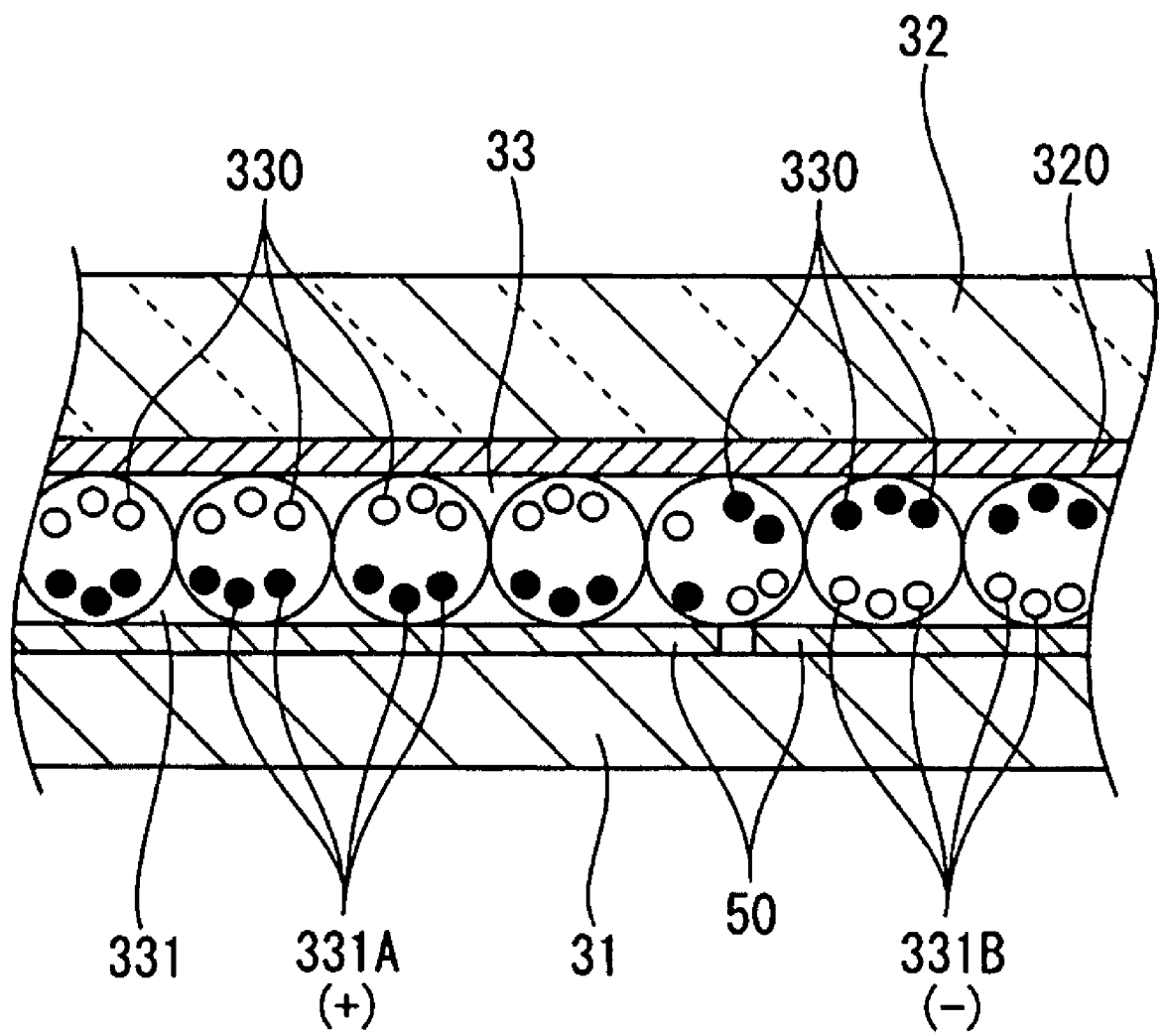
FIG. 8 is a schematic diagram of the electrophoretic layer in the preferred embodiment of the invention.

FIG. 8 is a schematic diagram of the electrophoretic layer 33. The electrophoretic layer 33 is rendered by a large number of microcapsules 330 sealed between the substrates as described above, and each microcapsule 330 contains an electrophoretic dispersion 331 containing numerous charged particles. In this aspect of the invention the electrophoretic dispersion 331 contains a mixture of black electrophoretic particles (referred to below as black particles) 331A and white electrophoretic particles (referred to below as white particles) 331B, and thus renders a two particle electrophoretic layer. The black particles 331A and the white particles 331B are oppositely charged, and in this embodiment of the invention the black particles 331A are positively charged while the white particles 331B are negatively charged.

When the symbol electrode 50 potential is LOW and the common electrode 320 potential is HIGH, an electric field flowing from the common electrode 320 to the symbol electrode 50 causes the positively charged black particles 331A to migrate to the symbol electrode 50 side while the negatively charged white particles 331B migrate to the common electrode 320 side. This causes the numeric symbol rendered by the symbol electrode 50 to be displayed white on the display panel 30 as indicated by the symbol "12" shown in FIG. 1.

This white display can be reversed by driving the symbol electrode 50 HIGH and driving the common electrode 320 LOW, thus causing the field to reverse and switching the display on the display panel 30 to show black.

A gray scale display presenting various gradations between black and white can be achieved by adjusting the level of the applied voltage and how long the voltage is applied to control the migration of the black particles 331A and the white particles 331B so that, for example, the symbols other than the white symbol "12", that is, the symbols for 1 to 11, are displayed at an intermediate gray level in FIG. 1.

When driving the electric field stops, the black particles 331A and the white particles 331B stop migrating, and the color displayed when the drive voltage is interrupted continues to be displayed until the next drive signal is applied.

5. Arrangement of the Symbol Electrodes

A novel feature of the present invention is the arrangement of the symbol electrodes 50 rendering numbers as design elements, and the arrangement of the symbol electrodes 50 is therefore described in further detail below.

Figure 9:
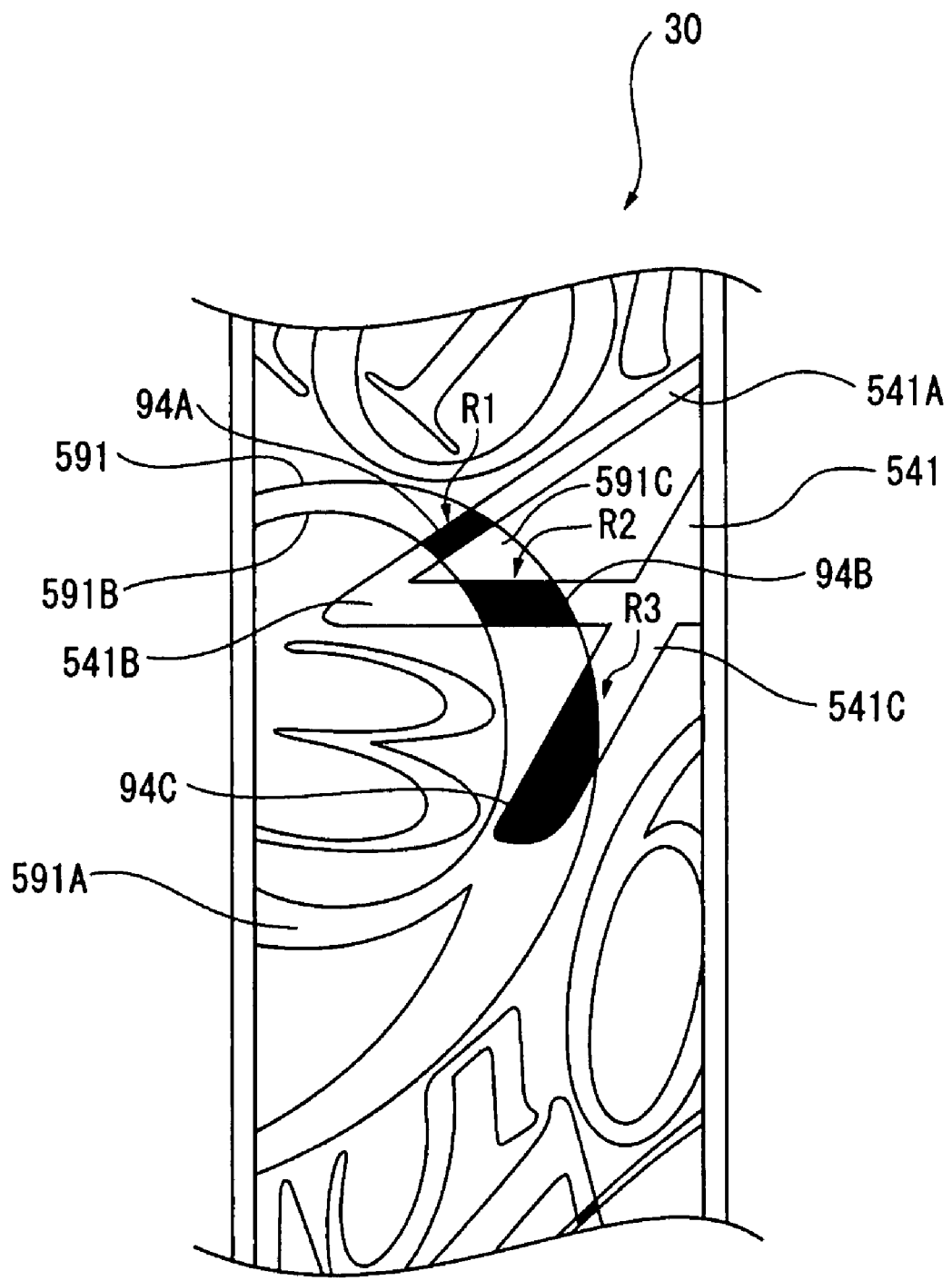
FIG. 9 is an enlarged view of a part of FIG. 6.

As shown in FIG. 6 some of the symbols displayed on the display panel 30 overlap one or more other symbols. Using by way of example the symbol electrodes 591 and 541 for the overlapping numeric symbols 9 and 4, respectively, as shown in FIG. 9, these overlapping symbol electrodes 50 have three overlapping areas R1 to R3.

The overlapping symbol electrodes 50 for every symbol that overlaps another symbol in at least one area on the display panel 30, including these symbol electrodes 591 and 541, are rendered by an overlapping electrode part having the same shape as the overlapping area and a non-overlapping electrode part. More specifically, the symbol electrode 591 for the symbol "9" includes three overlapping electrode parts 94A to 94C, and three non-overlapping electrode parts 591A to 591C rendering the parts of the display area of the symbol "9" that are separated from each other by the overlapping electrode parts 94A to 94C.

The symbol electrode 541 for the symbol "4" is rendered by these overlapping electrode parts 94A to 94C, and the three non-overlapping electrode parts 541A to 541C rendering the parts of the display area of the symbol "4" that are separated from each other by the overlapping electrode parts 94A to 94C.

When the symbol "4" or "9" is displayed, the overlapping electrode parts 94A to 94C and either non-overlapping electrode parts 591A to 591C or non-overlapping electrode parts 541A to 541C are synchronously driven to display the symbol "9" or "4," respectively.

The overlapping electrode parts 94A to 94C are connected to the back side of the display substrate 31 through corresponding vias 314 (FIG. 5), are connected to each other by the common wiring 312 crossing the vias 314, and are connected to the same pin of the display drive circuit unit 425 by the intervening wiring member 412.

The non-overlapping electrode parts 591A to 591C for the symbol "9" and the non-overlapping electrode parts 541A to 541C for the symbol "4" similarly communicate with the back side of the display substrate 31 through corresponding vias 314, and to the same pin of the display drive circuit unit 425 by the wiring 312 crossing these vias 314.

By thus using common pins to drive the electrodes that are driven synchronously, the total number of pin required to drive the display panel 30 can be kept to less than or equal to number of output pins on the display drive circuit unit 425.

Other symbols that overlap on the display panel 30 are similarly wired to use common pins.

6. Displaying Content on the Display Panel

Figure 10:
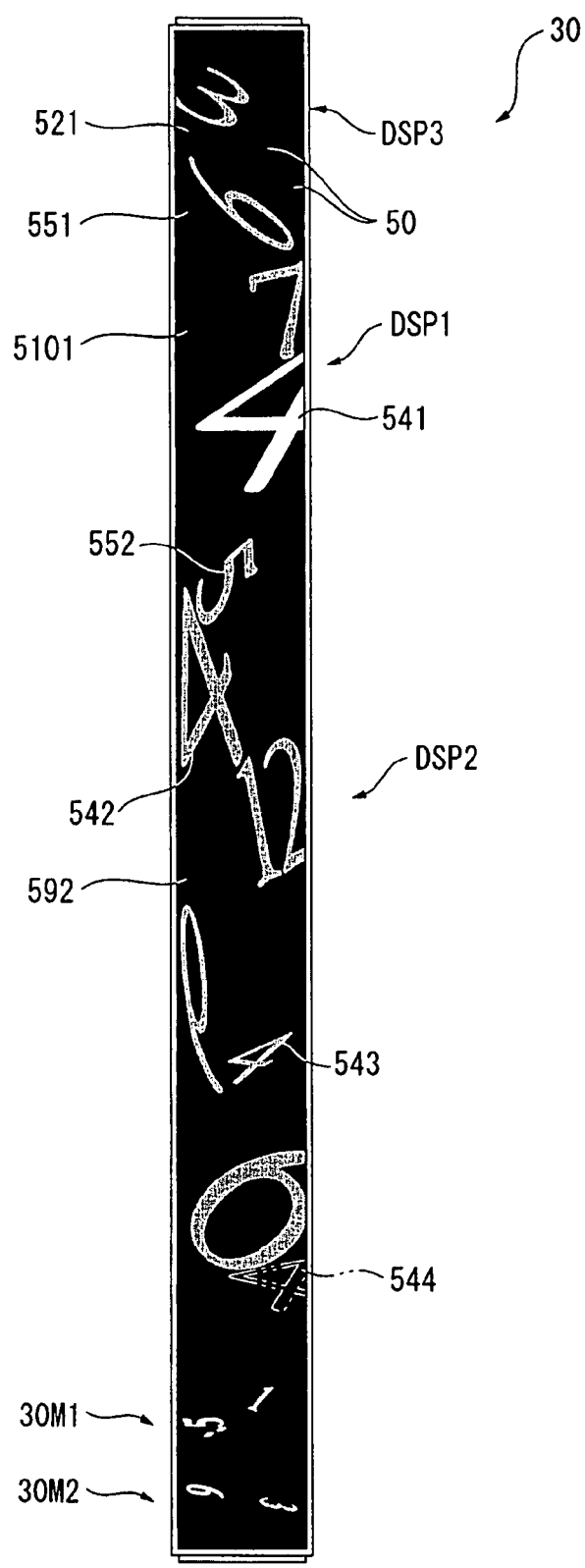
FIG. 10 shows an image display on the display panel in the normal operating mode in the preferred embodiment of the invention.

Displaying content on the display panel 30 is described next. FIG. 10 shows the display panel 30 in the normal display mode, and shows the area displayed by the symbol electrode 541 for the numeric symbol "4" displayed white to indicate a particular part of the time retrieved from the time information (the hour in this aspect of the invention). The time information display unit DSP1 that is driven white in this example indicates that the hour of the current time is 4. The same number is rendered by plural symbol electrodes in different areas of the display panel 30, and the symbol electrodes for the same numeric symbol are sequentially driven to display white in this aspect of the invention. In the example shown in FIG. 10, the time is in the hour of 4, that is, equal to or later than 4:00 and before 5:00, and the four symbol electrodes 541 to 544 are sequentially driven to sequentially display the number "4" in the corresponding display areas. The display sequence can be controlled as desired so that the symbols for the same number are displayed one after the other or a number of the same symbols are displayed simultaneously.

The number "5" is also displayed white in the tens display unit 30M1 and the number "19" is displayed white in the ones display unit 30M2, and the user thus knows that the current time is 4:59 in this example.

The areas corresponding to the symbol electrodes 50 other than symbol electrode 541 on the display panel 30 are driven to display a lower contrast than black/white, and this gray scale display DSP2 thus improves the design aesthetic of the display panel 30.

The display areas of the symbol electrodes 50 that are not used in the time information display unit DSP1 or the gray scale display DSP2, and the display area of the background display electrode (not shown), together render the background display part DSP3 of the display panel 30, and the background display DSP3 is driven to display black.

Figure 11:
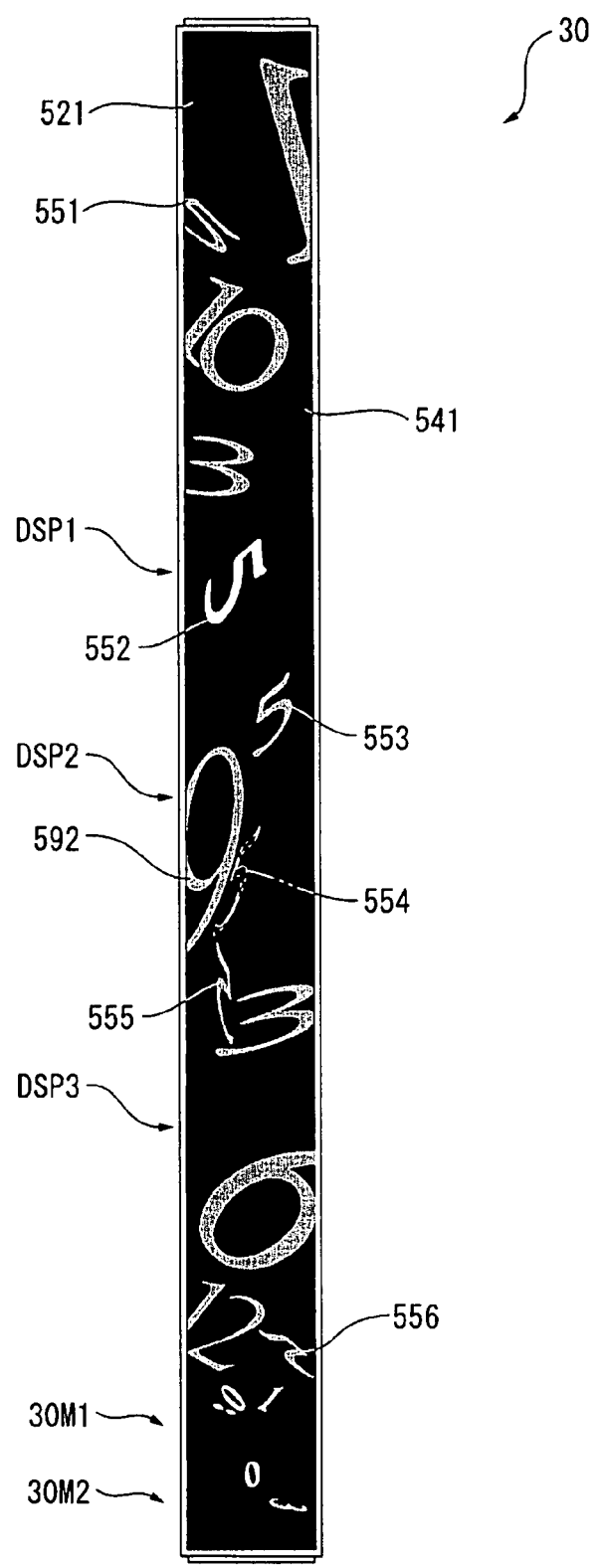
FIG. 11 shows an image display on the display panel in the normal operating mode in the preferred embodiment of the invention.

FIG. 11 shows the display panel 30 when the hour of the current time is 5. The symbol to be displayed as determined from the current time is "5" in this case, and the display area of the symbol electrode 552 for one of the six "5" symbols is displayed white on the display panel 30. When the hour is 5, the 5 in the display area of the six symbol electrodes 551 to 556 for the same symbol are thus sequentially driven to display white.

Figure 12A:
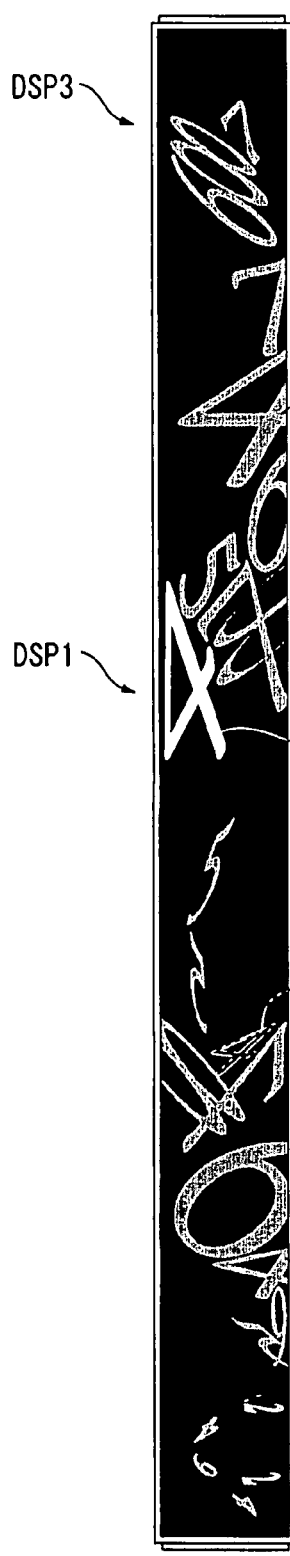
FIG. 12 shows an image display on the display panel in the design display mode in the preferred embodiment of the invention.
Figure 12B:
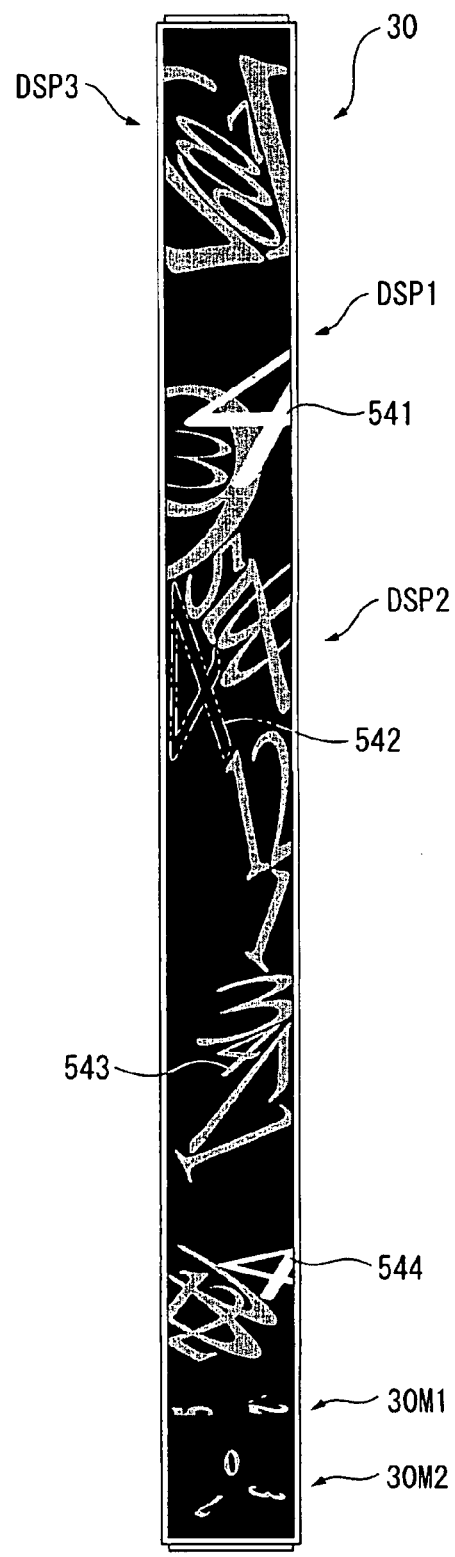

FIG. 12 shows the display panel 30 in the design display mode. The time information display unit DSP1, the gray scale display DSP2, and the background display DSP3 are each driven in FIG. 12A and FIG. 12B, but as illustrated in FIG. 12A and FIG. 12B the gray scale display DSP2 is driven so that the gray scale portion of the display appears to flow like a wave from one lengthwise end of the display panel 30 to the other end so that the displayed content seems to move.

Figure 13:
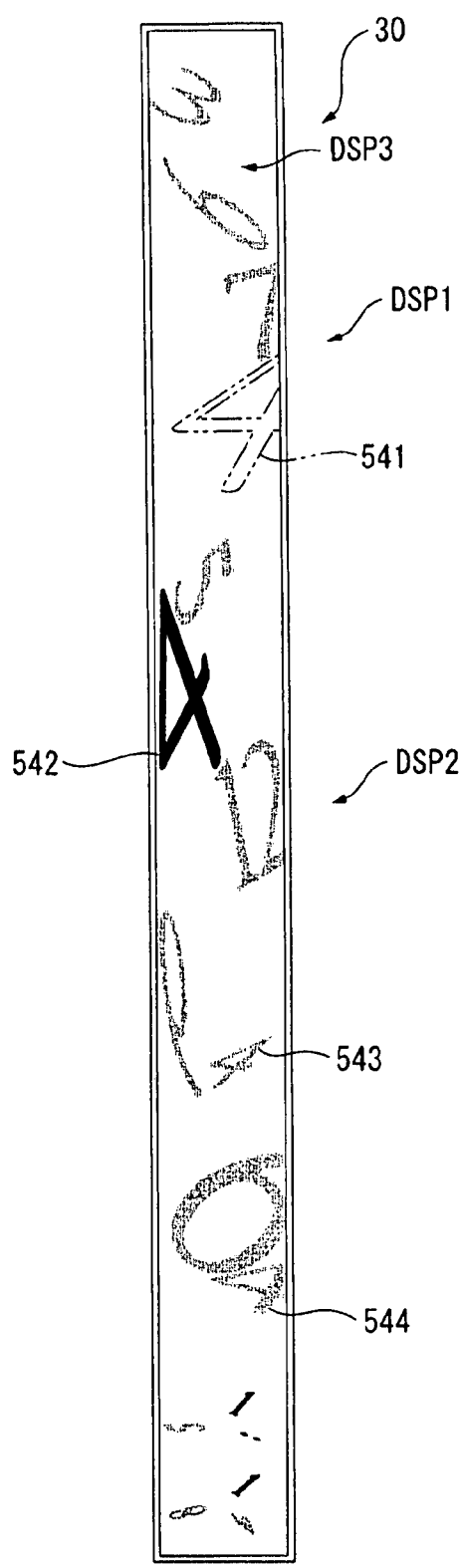
FIG. 13 shows an image display on the display panel in the reversed display mode in the preferred embodiment of the invention.

FIG. 13 shows the display panel 30 in the inverted display mode. In this mode the background color of the display panel 30 is white and the symbol denoting the hour is displayed black as a result of the drive control unit 61 reversing the potential of the common electrode 320 and the potential of the symbol electrodes 541 to 544 indicating the hour.

Other operating modes include, for example, a time adjustment mode and a flash mode that causes the entire display panel 30 to switch between black and white when the power is turned on, but further detailed description of these modes is omitted. The operating button 43 (FIG. 3, FIG. 7) is used to select the normal display mode, design display mode, and inverted display mode. Further alternatively, the display mode could switch automatically according to the time of day, such as day and night, or an alarm could be set to switch the display mode.

7. Display Panel Drawing Process

The basic process for drawing the display panel 30 is described next.

In this aspect of the invention the drive control unit 61 manages the current display level (referred to herein as the "current level") of each symbol electrode 50, sets a target display level (referred to herein as the "target level") for each symbol electrode 50, compares the current level and the target level, and controls the drawing process so that the current level goes to the target level.

7-1. Gray Levels

Figure 14:
FIG. 14 shows the gray scale levels that can be displayed on the display panel in the preferred embodiment of the invention.

As shown in FIG. 14, the display level can be set to one of a total 16 levels include black levels 1 to 8 and white levels 1 to 8. The display panel 30 has eight displayable gradations (determined by the reflectivity and contrast of the display) including black levels 1 to 4 and white levels 1 to 4. The levels outside this range, that is, black levels 5 to 8 and white levels 5 to 8, are set when the maximum gradation (black level 4 or white level 4) is held for a predetermined time and are set by the current level updating process described below based on how long the maximum gradation is held.

Black levels 1 to 3 and white levels 1 to 3 are intermediate gray levels between black and white. To display one of these intermediate gray levels, the desired gray level is set as the target level, and the display area is redrawn by applying a drive signal (referred to below as drive signal COM) having a pulse count determined by the desired gray (display) level. More specifically, to redraw a display area from white level 4 to black level 1, the target level is set to black level 1 and a pulse signal is applied four times according to the drive method described below. To redraw the display area from white level 4 (white) to black level 4 (black), a pulse signal is applied 7 times as described in detail below. By thus applying a drive signal of a pulse count less than the 7 pulses needed to change from white level 4 (white) to black level 4 (black), such as four pulses, migration (the distance moved) of the white particles 331B and black particles 331A inside the microcapsules 330 can be reduced and the relative positions of the white and black particles can be freely controlled to achieve the desired intermediate gradation in this aspect of the invention.

7-2. Redrawing Operation of the Drive Signal

Figure 15:
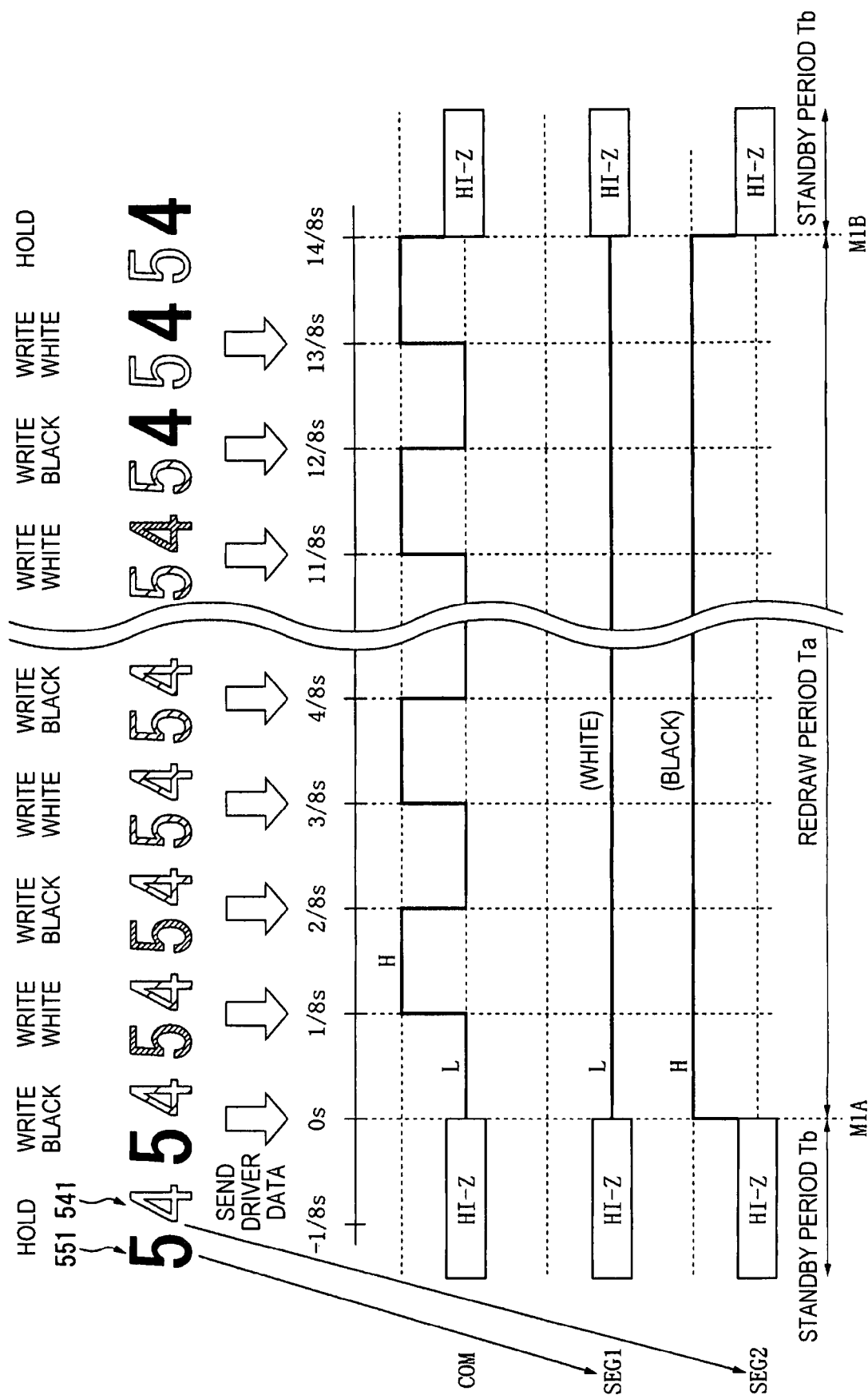
FIG. 15 shows examples of the drive signal waveforms applied to the display panel in the preferred embodiment of the invention.

FIG. 15 shows an example of the waveform of the drive signal applied to the display panel 30, and is used to describe how the display level (color) of each electrode of the display panel 30 changes simultaneously and how the color gradation (gray level) is changed. FIG. 15 uses by way of example changing the display area of the symbol electrode 541 connected to the symbol 4 from white to black, and changing the display area of the symbol electrode 551 connected to the symbol 5 from black to white in order to redraw the display panel 30 from displaying the hour of "4" as shown in FIG. 10 to the hour of "5" as shown in FIG. 11.

Note that in FIG. 15 the drive signal supplied to the common electrode 320 is denoted COM, the drive signal applied to the symbol electrode 551 for the symbol 5 that changes from black to white is denoted SEG1 (LOW potential), and the drive signal applied to the symbol electrode 541 for the symbol 4 that changes from white to black is denoted SEG2 (HIGH potential). Drive signal SEG is used when differentiating between drive signal SEG1 and drive signal SEG2 is not necessary.

As shown in the figure, redraw period Ta is the time from when the drive control unit 61 starts outputting the display redraw signal (driver data) to the display drive unit 62 at time M1A to the time when redrawing is completed at time M1B. This redraw period Ta is the period in which the display drive unit 62 applies the drive signals COM and SEG to the common electrode 320 and symbol electrodes 50 to change the display color of each symbol electrode 50 and change the displayed time, for example.

The standby period Tb is the period from when the display drive unit 62 finishes redrawing the display to change the time, for example, until the next display redraw signal is applied to redraw the display. The operating mode of the display drive unit 62 enters an energy conservation mode during this standby period Tb. In the standby period Tb the display drive unit 62 sets the output pin that sets the operating mode to the energy conservation mode to the high impedance state. A potential difference therefore does not occur between the common electrode 320 and the symbol electrodes 50 during the standby period Tb, and the color displayed by each symbol electrode 50 remains the color that was set during the redraw period Ta.

This embodiment of the invention changes the display color from white to black and changes the display color from black to white simultaneously during the redraw period Ta. More specifically, the display drive unit 62 outputs drive signals SEG to the symbol electrodes 50 and outputs the drive signal COM to the common electrode 320. The voltage level of the drive signals SEG is set according to the display color (black or white). The voltage level of the drive signal COM changes over time according to the display color.

The drive signal COM in this aspect of the invention is more specifically a pulse signal that changes between a HIGH potential (+15 V) and a LOW potential (0 V) according to the display redraw signal (driver data). The pulse width of each pulse of the drive signal COM is set to a frequency (125 ms in this embodiment of the invention) that can be generated by frequency dividing a signal output from an oscillation circuit not shown, and the drive signal COM can be generated based on this frequency-divided signal. The drive signal COM thus switches between a LOW potential and HIGH potential every 125 ms in this example. The gray level of the color displayed by a symbol electrode 50 can be adjusted by desirably adjusting the pulse count of the drive signal COM according to the number of times the display redraw signal is output.

As a result, when the voltage of the drive signal COM is LOW in the redraw period Ta, an electric field is produced between the common electrode 320 (LOW potential) and the symbol electrode 541 to which the drive signal SEG2 (HIGH potential) is applied. This causes the black particles 331A in the microcapsules 330 to migrate to the common electrode 320 side, causes the white particles 331B to migrate to the symbol electrode 541 side, and thus causes the display color of the symbol electrode 541 to change one gradation towards black.

When the drive signal COM voltage then goes HIGH, the common electrode 320 goes HIGH and a field is produced between the common electrode 320 and the symbol electrode 551 to which the drive signal SEG1 (LOW) is applied. This causes the white particles 331B in the microcapsules 330 to migrate toward the common electrode 320 side, causes the black particles 331A to migrate toward the symbol electrode 541 side, and thus causes the display color of the symbol electrode 551 to shift one gradation towards white.

This process repeats so that the black particles 331A and the white particles 331B migrate gradually according to the change in the drive signal COM voltage over time between the common electrode 320 and the symbol electrodes 551 and 541. The display color of the symbol electrodes 551 and 541 thus changes in steps, the display color of the symbol electrode 551 becomes white and the display color of the symbol electrode 541 becomes black by the end of the redraw period Ta, and the hour displayed as white on the display panel 30 moves from the display area of the symbol electrode 541 to the display area of the symbol electrode 551.

7-3. Basic Operation of the Redraw Process

The process for redrawing the display panel 30 is described next with reference to the flow chart in FIG. 16. This redraw process is triggered to update the time and to update the display content of the display panel 30 when a display update command is asserted by pressing a operating button 43, for example. In this example the symbol electrodes 50 are redrawn at one hour intervals in principle (rewriting the symbol electrodes for the same symbol) and the minute display unit 30M is redrawn at a one minute interval.

As shown in FIG. 10 (displaying 4:59) and in FIG. 11 (displaying 5:00), the display changes when different electrodes are driven to update the time. FIG. 16 shows by way of example updating five electrodes, the symbol electrode 551 for the "5" that is black in FIG. 10, the symbol electrode 552 for the "5" that is a gray level in FIG. 10, the symbol electrode 541 for the "4" that is white in FIG. 10, the symbol electrode 592 for the "9" that is black in FIG. 10, and the symbol electrode 521 for the "2" that is black in both FIG. 10 and FIG. 11.

In this example the current level of these five symbol electrodes 551, 552, 541, 592, and 521 at the start of the redraw process is black level 4, black level 2, white level 4, black level 4, and black level 4, respectively, and the four symbol electrodes 551, 552, 541, 592 that are updated are redrawn to white level 4, white level 4, black level 4, and black level 2, respectively. The display color of the symbol electrode 521 remains unchanged at black level 4. The intermediate gray level in this example is black level 2 but the invention is not so limited and the intermediate gray level can be set as desired in the range from black level 3 to white level 3. A different gradation level could obviously be set for each electrode.

Figure 16:
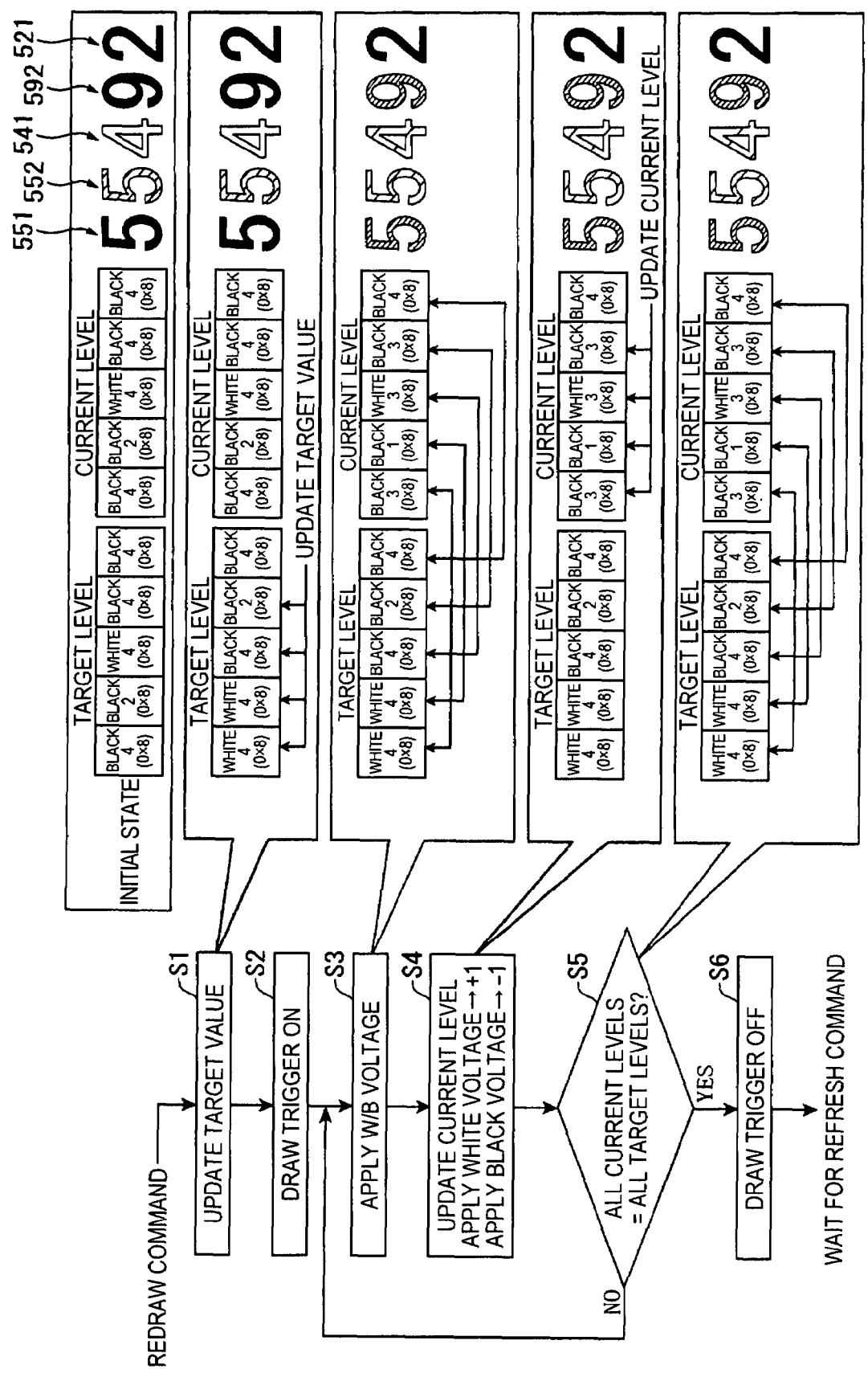
FIG. 16 is a flow chart describing the basic operation of the drawing process of the display panel in the preferred embodiment of the invention.

The target level and the current level are assumed to be the same when the redraw process starts as shown in FIG. 16.

When the display redraw signal is asserted, the drive control unit 61 updates the target level for each of the symbol electrodes 551, 552, 541, 592 to be refreshed (step S1), and then sets the draw trigger on (step S2). When the draw trigger goes on, the drive control unit 61 starts outputting the display redraw signal (driver data) to the display drive unit 62.

More specifically, the drive control unit 61 compares the current level and the target level for each symbol electrode 50, blank electrode (not shown), and each electrode in the minute display unit 30M, identifies the electrodes for which the current level and the target level differ, determines whether the change is to white or to black, and based on the result outputs a display redraw signal for each electrode to be changed to the display drive unit 62 (step S3). The display redraw signal indicates whether the display area of the electrode is to change to white or to black.

When the display redraw signals are input, the display drive unit 62 outputs the drive signal SEG1 (LOW) to the electrodes of the display areas that change to white, outputs the drive signal SEG2 (HIGH) to the electrodes of the display areas that change to black, and outputs one pulse of the drive signal COM to the common electrode 320. This supplies a LOW voltage and a HIGH voltage for 125 ms each to the common electrode 320, and this one pulse causes the display color of symbol electrodes 551, 552 and 592 to change one gradation from black to white, and causes the display color of symbol electrode 541 to change one gradation from white to black.

The drive control unit 61 then updates the current level of symbol electrodes 551, 552, 541, 592 one gradation (step S4), and determines if the updated current level matches the target level for all electrodes (step S5). If not (step S5 returns NO), control loops back to step S3.

The drive control unit 61 thus intermittently outputs the display redraw signal to the display drive unit 62 until the current level matches the target level of each electrode, and updates the current level one increment each time the display redraw signal is output. The voltage level of the drive signal COM supplied to the common electrode 320 changes as shown in FIG. 15 while the pulse count of the drive signal COM varies according to the difference between the current level and the target level. As a result, the display color of the symbol electrodes 551, 552 that are held LOW thus changes to the display color of white level 4 that matches the target level while the display color of the symbol electrode 541 held HIGH changes to the display color of black level 4 that matches the target level.

When the current level and the target level of all symbol electrodes 551, 552, 541, 592 match (step S5 returns YES), the drive control unit 61 turns the draw trigger OFF (step S6). This completes the basic operation of the display drawing process.

7-4. Display Refresh Process

This embodiment of the invention applies a display refresh process to the electrodes of the display panel 30 that display black or white instead of an intermediate gradation (referred to below as the black/white display electrodes) in order to update the display color gradation at a regular interval.

Figure 17:
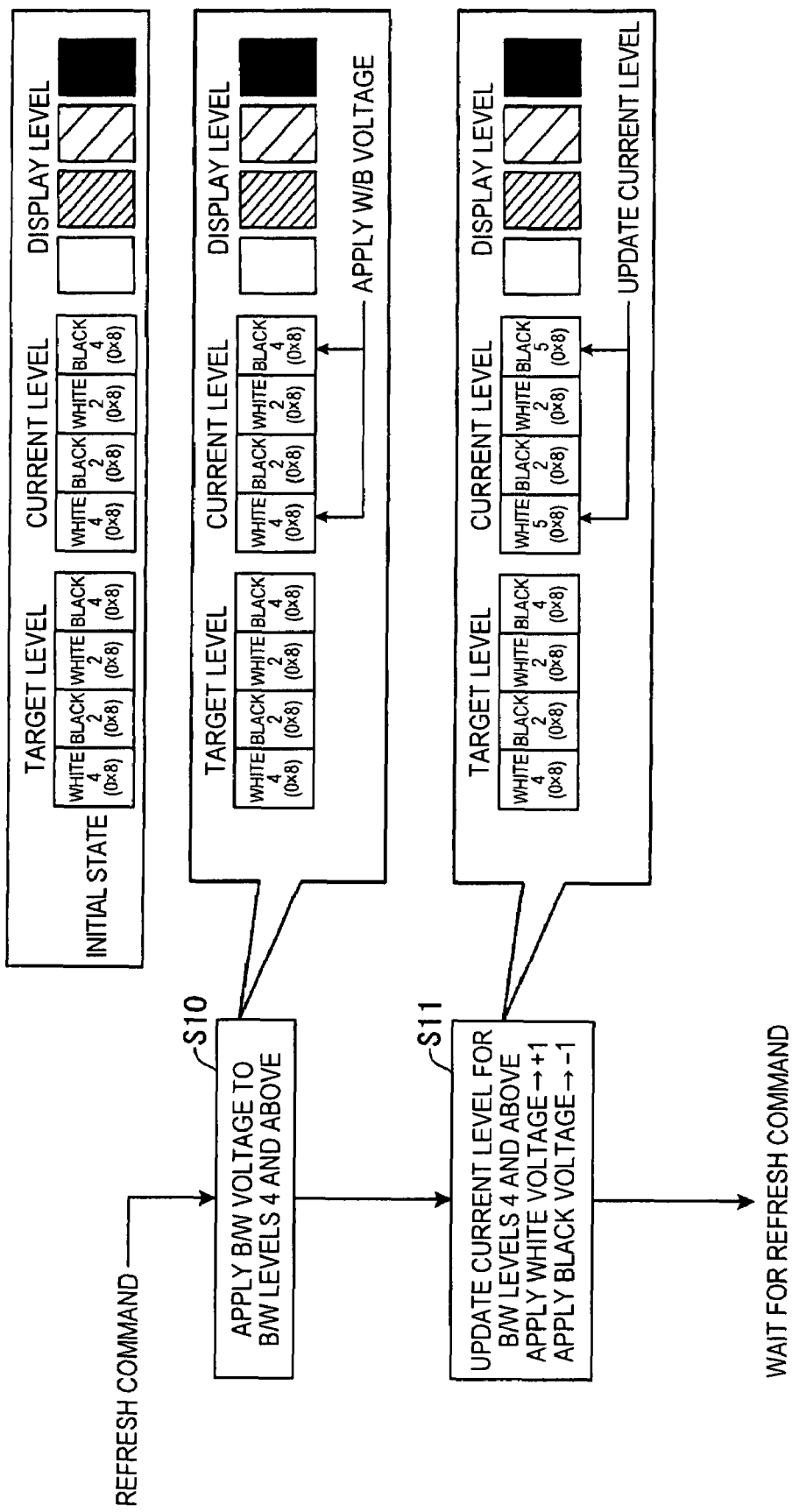
FIG. 17 is a flow chart describing the display refreshing process of the display panel in the preferred embodiment of the invention.

More specifically, when the predetermined refresh interval is reached, the drive control unit 61 gets the current level of each black/white display electrode, and applies the draw process to write black to the electrodes for which the current level is black level 4 or greater (that is, black levels 4 to 8) and write white to the electrodes for which the current level is white level 4 or greater (that is, white levels 4 to 8) (step S0) (see FIG. 17). More specifically, the drive control unit 61 outputs a display redraw signal to write black to the electrodes at black level 4 or higher so that the display drive unit 62 changes the display color one gradation (writes black) as shown in FIG. 15, and outputs a display redraw signal to write white to the electrodes at white level 4 or higher so that the display drive unit 62 changes the display color one gradation (writes white).

The display color of electrodes set to black level 4 or greater and white level 4 or greater, that is, the display color of electrodes set to the highest black level and the highest white level of the display panel 30, can gradually shift over time towards an intermediate gradation. This display refresh process avoids this problem and prevents this shift in gradation (reflectivity and contrast).

7-5. Process for Updating the Current Level

After the display refresh process, the current level of the black/white display electrodes is updated according to how long the corresponding display area has displayed black or white continuously.

More specifically, the value of the current level of each electrode for which the current level is set to black level 4 or higher (black level 4 to 8) or white level 4 or higher (white level 4 to 8) is incremented one. More specifically, black level 4 is updated to black level 5 and so forth until black level 7 is updated to black level 8, and white level 4 is updated to white level 5 and so forth until white level 7 is updated to white level 8 (current level updating process (step S11)). If the black level or white level is already set to the highest display level (see FIG. 14), that is, black level 8 and white level 8 in this embodiment of the invention, the current level remains unchanged.

Note that this current level updating process is not limited to executing every time the display refresh process runs, and the current level updating process could execute when the display refresh process has executed a specific number of times (such as every ten times).

This embodiment of the invention thus updates the current level for the black and white display electrodes that are not displaying an intermediate value between the maximum black and white levels to a higher value proportionally to the time that the color has been continuously displayed. When the display color of these black/white display electrodes is then changed, the difference between the target level and the current level thus increases as the time that the color was displayed continuously before being changed increases. As a result, the pulse count of the drive signal COM supplied to change the display color during the redraw process increases.

This current level updating process is applied because of the electrophoretic characteristic of the display, that is, because the migration rate of the electrophoretic particles in the electrophoretic layer 33 slows when the display state of the display panel 30 remains unchanged for an extended period of time. More specifically, the longer that the display color is continuously displayed, the pulse count of the drive signal COM increases according to the migration distance of the electrophoretic particles to increase the drive power (the time the voltage is applied in this example). As a result, the display color can be reliably changed to black or to white based on the change in electrophoretic characteristics. Displaying uneven colors as a result of a change in the electrophoretic characteristic can thus be avoided, and display quality (design, appearance, and readability) can be improved. By incrementally increasing the pulse count of the drive signal COM according to the continuous display time of the display color, this embodiment of the invention assures sufficient drive power and reduces power consumption.

8. Effect of the Invention

The invention thus described provides the following benefits.

(1) The display panel 30 of the timepiece 1 has symbol electrodes 50 in the shape of graphic elements representing the numeric symbols used to display time information, and the symbol electrodes 50 can be selectively driven based on the time information to display the appropriate symbol in the display area corresponding to the selected symbol electrode 50. By thus rendering the symbol electrodes 50 in the shape of the symbols, the number of pins needed to drive the electrodes can be significantly reduced compared to the related art even when numerous symbols can be displayed. Because the pin count can thus be greatly reduced, the number of pins required to drive all electrodes of the display panel 30 can be kept within the limited number of output pins on the display drive circuit unit 425.

(2) The symbol electrodes 50 can also be freely shaped and individual symbol electrodes 50 can have many curves and be individually designed. The layout of the symbol electrodes 50 in the display panel 30 can also be freely designed, and timepieces 1 featuring designs heretofore impractical can be achieved.

(3) The part of the display that is driven to render the time information DSP1 also moves from one symbol electrode 50 to another symbol electrode 50 as the time changes from 1:00 to 2:00 and so forth to 12:00, and the timepiece 1 thus affords an innovative design.

(4) Using a flexible display panel 30 enables rendering the display panel 30 in a ring so that the display area can cover a broad area around the wrist. This affords a large display panel 30. In addition, despite having a large display area, the same symbol (such as the "4" associated with symbol electrodes 541 to 544) is sequentially displayed at different positions on the display panel 30, the symbols can be read from different directions to the display panel 30, and the readability of the time information can thus be improved.

The effect of reducing the number of required pins is further enhanced because content can be displayed over a broad display area using few pins as described above. The appearance of the timepiece can also be improved by using a large display.

(5) The display panel 30 has a gray scale display DSP2 in addition to a time information display DSP1, thus increasing the number of design elements and further improving the screen design of the display panel 30. Furthermore, because the contrast of the gray scale display DSP2 to the background display DSP3 is lower than the contrast of the time information display unit DSP1 to the background display DSP3, the readability of the time information can be balanced with the desired aesthetic design.

The symbols other than the symbols selected for displaying the time information (the "4" in FIG. 10) can also be made readable by means of the gray scale display DSP2, the position of each symbol will be remembered naturally with use, and usability as a timepiece for knowing the time can be improved.

(6) Numeric symbols on the display panel 30 may also overlap, and the symbol electrodes 591, 541, for example, associated with the overlapping areas R1, R2, R3 include the overlapping electrode parts 94A to 94C and non-overlapping electrode parts 591A to 591C or 541A to 541C. Using such overlapping electrode parts 94A to 94C enables intricate designs having overlapping symbols, and can be used to improve the design.

(7) The number of pins needed to drive the display can also be reduced by interconnecting the electrode parts connected to the common parts of overlapping symbols and connecting these interconnected electrode parts to a common pin, such as by interconnecting the overlapping electrode parts 94A to 94C connected to the overlapping areas R1, R2, R3 created by two symbols overlapping in multiple places in the embodiment described above. Images with intricate designs can thus be achieved because more symbol electrodes 50 can be efficiently disposed within the limited number of output pins available on the display drive circuit unit 425.

(8) The pin count can be further reduced because a plurality of non-overlapping electrode parts 591A to 591C and 541A to 541C can be connected to common pins.

Embodiment 2

A second embodiment of the invention is described next.

This embodiment of the invention differs from the first embodiment in that all of the electrodes for the same symbols are connected together.

This embodiment of the invention also does not use a gray scale display DSP2 such as shown in FIG. 10.

Figure 18:
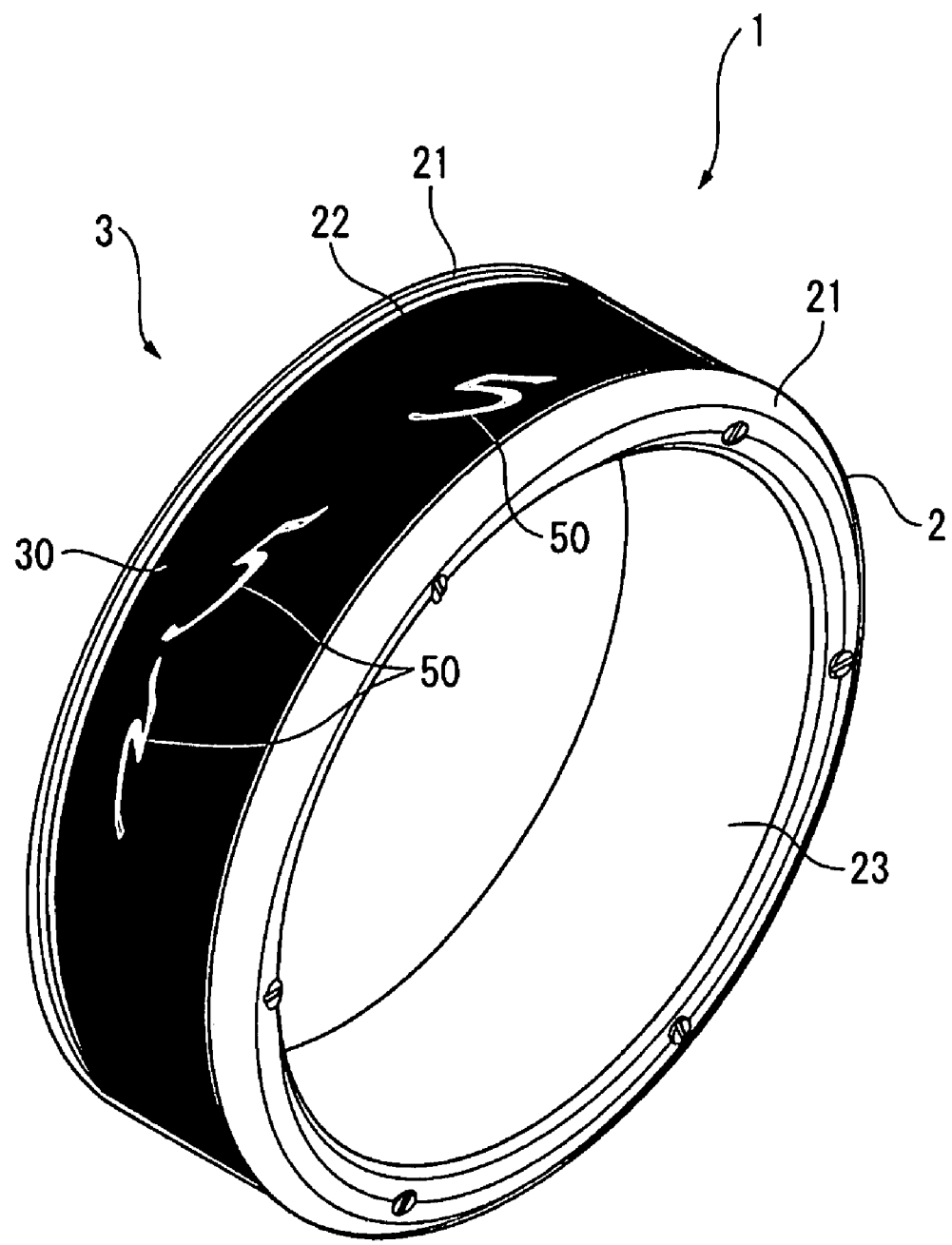
FIG. 18 is an external oblique view of an electronic timepiece according to a second embodiment of the invention.
Figure 19:
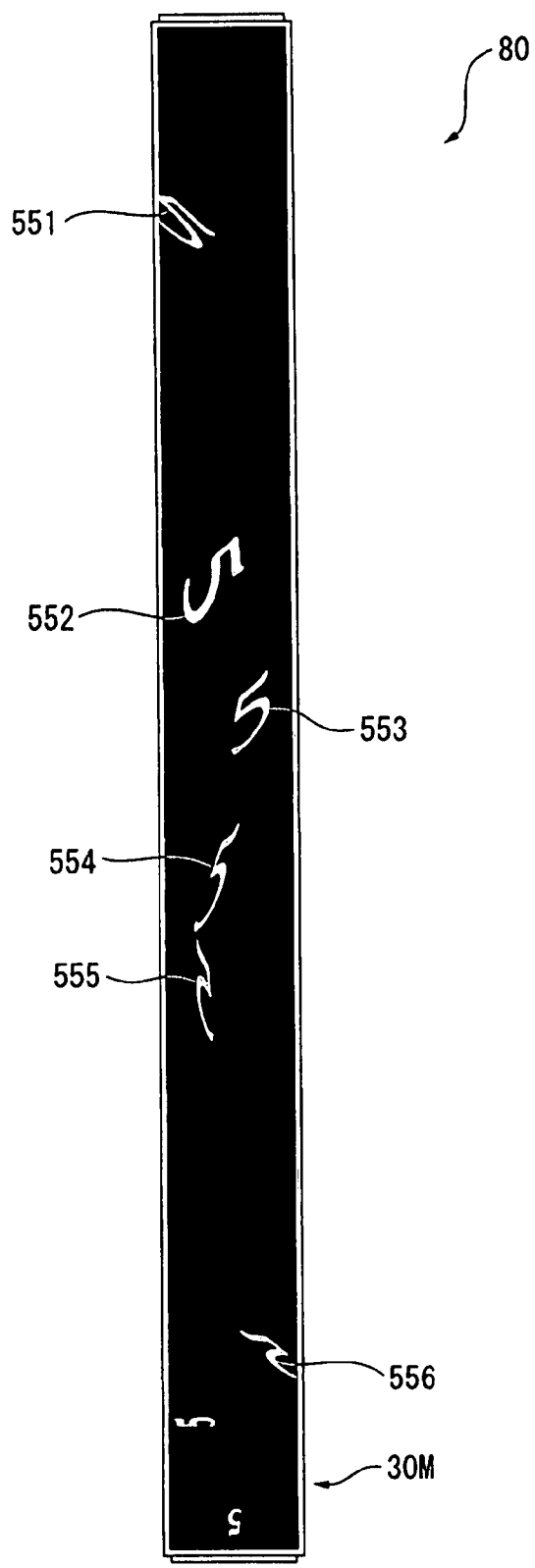
FIG. 19 is a plan view of the electrophoretic display panel in the second embodiment of the invention.

FIG. 18 is an oblique view of a timepiece according to this embodiment of the invention, and FIG. 19 is a plan view of the display panel 80 of this timepiece. The timepiece in these figures shows the hour of the current time as 5 o'clock and all symbol electrodes 50 for the "5" symbols are driven so that all of the "5" symbols display white at the same time. Note that the numeric symbols for the numbers other than 5 are similarly driven to display the hour.

More specifically, the symbol electrodes 50 for the symbols for the same numbers are connected to each other, and the symbol electrodes 551 to 556 for the symbol "5" are thus connected to a common node in this example. This is accomplished by connecting each symbol electrode 50 through the corresponding via 314 (see FIG. 5) to the potential on the back side of the display substrate 31, and rendering the wiring 312 across the vias 314 for the electrodes driven to the same potential. The wiring 312 is then connected by the intervening wiring member 412 to the display drive circuit unit 425 on the circuit board 42.

Note that symbol electrode 556 overlaps symbol electrode 593 as shown in FIG. 6 and is therefore divided into an overlapping electrode part and a non-overlapping electrode part, and the non-overlapping electrode part of the symbol electrode 556 is connected to a common node with symbol electrodes 551 to 555 because the overlapping electrode part is not synchronized to the other symbol electrodes 551 to 555.

By connecting the symbol electrodes for the same symbols, such as symbol electrodes 551 to 556, together at a common node, the pin count can be further reduced. This aspect of the invention also affords the benefits of the first embodiment.

Variations of the Invention

The invention has been described with reference to a preferred embodiment, but the invention is not limited to the foregoing embodiment of the invention and variations and improvements achieving the object of the invention are included in the scope of the invention.

For example, the foregoing embodiment of the invention describes a black and white, two particle electrophoretic display using black particles 331A and white particles 331B, but the invention is not so limited. More particularly, colors other than black and white can be used and the invention can be used with a blue/white single-particle electrophoretic display, for example.

The invention has been described using two overlapping symbols by way of example, but the invention is not so limited. More particularly, the same arrangement can be used to render three overlapping symbols, for example, with the same effect.

The symbols used to display time information on the display panel are also not limited to Arabic numerals, and the symbols could be letters of the alphabet or symbols, Greek numerals, or kanji, for example.

Furthermore, when symbol electrodes have multiple overlapping areas in combinations of the same numbers at discrete non-adjacent positions on the display panel, the symbol electrodes for these non-adjacent overlapping areas can also be connected to the same pin, depending on the wiring pattern. This wiring can be achieved by displaying a flexible circuit board layer on the back (the surface on the opposite side as the transparent circuit board) of the display circuit board, for example.

An example of such electrodes connected together is described with reference to FIG. 6. In FIG. 6 the symbols "7" and "8" overlap at two different parts of the display panel 30 so that symbol electrodes 571 and 581 share three overlapping electrode parts 781A to 781C, and symbol electrodes 572 and 582 share three overlapping electrode parts 782A to 782C. In this example, symbol electrodes 572 and 582 and overlapping electrode parts 781A to 781C and 782A to 782C can all be connected to a common node.

The case 2 is also described as circular in the embodiment described above, but the case could be an oval or polygon. The display panel 30 is also described as a large display curving substantially 360 degrees, but the invention is not so limited and a display panel that is flat and does not curve could have a band attached to render a wristwatch, for example.

The timepiece of the invention is also not limited to a wristwatch, and could be a pocket watch, a mantle clock, or a wall clock, for example. The invention can also be used in a wide range of electronic devices having a timepiece function, including, for example, personal digital assistants (PDA), cell phones, memory cards, digital cameras, video cameras, printers, and personal computers.

Although the present invention has been described in connection with the preferred embodiments thereof with reference to the accompanying drawings, it is to be noted that various changes and modifications to the shape, material, quantity, and other details will be apparent to those skilled in the art. Such changes and modifications are included within the scope of the present invention as defined by the appended claims, unless they depart therefrom.

The entire disclosure of Japanese Patent Application No. 2006-181393, filed Jun. 30, 2006 is expressly incorporated by reference herein.

What is claimed is:

1. A timepiece comprising:
a display panel having electrophoretic particles between two opposing substrates;
a drive circuit unit having a display drive unit for applying an electric field between the substrates and a timekeeping unit for keeping time information;
a plurality of first electrodes being rendered in the shapes of a plurality of symbols used to display time information content on one of the substrates; and
a second electrode being disposed on the other substrate for applying a voltage between the first electrodes and the second electrode,
the plurality of first electrodes being rendered for each type of symbol,
each of the first electrodes for the same type of symbol being rendered at a different position on the surface of the one of the substrates,
each of the plurality of first electrodes for the same type of symbol being electrically connected to each other.

2. The timepiece described in claim 1, wherein the drive circuit unit executes
a time information display process to display a symbol selected based on the time information at a specific contrast to a background display part outside the symbol on the display panel, and an intermediate gradation display process to display a symbol other than the selected symbol at a lower contrast than the specific contrast to the background display unit.

3. The timepiece described in claim 1, wherein
at least one of the first electrodes is shaped so that the corresponding symbol partially overlaps one or more of the other symbols, and the overlapping first electrodes are rendered by an overlapping electrode part forming the overlapping area where the symbols overlap, and a non-overlapping electrode part outside the overlapping electrode part.

4. The timepiece described in claim 3, wherein
non-overlapping electrode parts are separated by the overlapping electrode part, and the separated non-overlapping electrode parts are electrically connected together.

5. The timepiece described in claim 3, wherein
a plurality of overlapping electrode parts are formed by one symbol and another symbol overlapping at a plurality of locations, and the same combinations of overlapping symbols are electrically connected to each other in the overlapping electrode parts.

6. The timepiece described in claim 1, wherein
the substrates are made from a flexible material, and
the display panel curves substantially in a ring shape.

* * * * *